(12) United States Patent
Hotta et al.

(10) Patent No.: US 6,256,726 B1
(45) Date of Patent: Jul. 3, 2001

(54) DATA PROCESSOR FOR THE PARALLEL PROCESSING OF A PLURALITY OF INSTRUCTIONS

(75) Inventors: Takashi Hotta; Shigeya Tanaka; Hideo Maejima, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 07/979,772

(22) Filed: Nov. 20, 1992

Related U.S. Application Data

(63) Continuation of application No. 07/433,368, filed on Nov. 8, 1989, now Pat. No. 5,233,694.

(30) Foreign Application Priority Data

Nov. 11, 1988  (JP) .................................................. 63-283673

(51) Int. Cl.[7] ................................ G06F 9/38; G06F 9/30
(52) U.S. Cl. .......................... 712/213; 712/215; 712/223
(58) Field of Search ................................... 395/375, 800, 395/775, 425, 725, 475

(56) References Cited

U.S. PATENT DOCUMENTS

| | | | |
|---|---|---|---|
| 3,614,745 | * 10/1971 | Podwig et al. | 395/650 |
| 3,771,138 | 11/1973 | Celtruda et al. | 712/205 |
| 4,437,149 | 3/1984 | Pomerens et al. | 364/200 |
| 4,476,525 | 10/1984 | Ishii | 364/200 |
| 4,594,655 | 6/1986 | Hdo et al. | 364/200 |
| 4,620,275 | * 10/1986 | Wallach et al. | 395/800 |
| 4,626,989 | 12/1986 | Torii | 364/200 |
| 4,644,466 | 2/1987 | Saito | 364/200 |
| 4,677,545 | 6/1987 | Blahut | 712/245 |
| 4,722,050 | * 1/1988 | Lee et al. | 395/375 |
| 4,789,925 | * 12/1988 | Lahti | 395/800 |
| 4,794,517 | 12/1988 | Jones et al. | 395/725 |
| 4,825,360 | * 4/1989 | Knight, Jr. | |
| 4,858,105 | * 8/1989 | Kuriyama et al. | 395/375 |
| 4,873,629 | * 10/1989 | Harris et al. | |
| 4,916,606 | 4/1990 | Yamaoka et al. | 364/200 |
| 4,928,223 | 5/1990 | Dao et al. | 395/375 |
| 4,928,226 | 5/1990 | Kamada et al. | 364/200 |
| 4,942,525 | 7/1990 | Shintani et al. | 364/200 |
| 5,043,868 | * 8/1991 | Kitamura et al. | 395/725 |
| 5,072,364 | * 12/1991 | Jardine et al. | 395/375 |
| 5,101,341 | 3/1992 | Circetto et al. | 395/375 |

FOREIGN PATENT DOCUMENTS

| | | |
|---|---|---|
| 0042442 | 12/1981 | (EP) . |
| 0082903 | 7/1983 | (EP) . |
| 0147858 | 7/1985 | (EP) . |
| 0149049 | 7/1985 | (EP) . |
| 0101596 | 8/1987 | (EP) . |
| 0239081 | 9/1987 | (EP) . |
| 0260409 | 3/1988 | (EP) . |
| 63-73332 | 2/1988 | (JP) . |
| 63-131230 | 6/1988 | (JP) . |
| 63-131230A | 10/1988 | (JP) . |
| WO8809035A | 11/1988 | (WO) . |

OTHER PUBLICATIONS

Gerold S. Toden et al, "Detection and Parallel Execution of Independent Instructions", *IEEE Transactions,* Oct. 1970, vol. C–19, No. 10, pp. 889–885.

(List continued on next page.)

*Primary Examiner*—Mehmet B. Geckil
(74) *Attorney, Agent, or Firm*—Antonelli, Terry, Stout & Kraus, LLP

(57) ABSTRACT

The data processor for executing, instructions realized by wired logic, by a pipeline system, includes a plurality of instruction registers, and arithmetic operation units of the same number. A plurality of instructions read in the instruction registers in one machine cycle at a time are processed in parallel by the plurality of arithmetic operation units.

31 Claims, 23 Drawing Sheets

OTHER PUBLICATIONS

R.D. Acosta et al, "An Instruction Issuing Approach to Enhancing Performance in Multiple Functional Unit Processes", *IEEE Transactions on Computers,* Sep. 1986, vol. C–35, No. 9, pp. 815–828.

David J. Hilja, "Reducing the Branch Penalty in Pipelined Processors", *Computer,* Jul. 1988, pp. 47–55.

Miller et al, "Floating–Duplex Decode and Execution of Instruction", *IBM Technical Disclosure Bulletin,* Jun. 1980, vol. 23, No. 1, pp. 409–412.

*IEEE Journal of Solid–State Circuits,* "MIPS–X: A 20–MIPS Peak 32–bit Microprocessor with On–Chip Cache", Horowitz, et al., vol. sc–22, No. 5, Oct. 1987, New York.

Technical Summary, Multiflow Computer, Inc., Apr. 30, 1987, pp. 1–(3–7).*

Omrl Serlin, "The Serlin Report on Parallel Processing", ITOM International Co., Issue No: 7, Dec. 4, 1987, pp. 10–18.*

John Bond, "Parallel–Processing Concepts Finally Come Together in Real Systems", Computer Design, Jun. 1, 1987, pp. 51–74.*

Garold S. Trader et al, "Detection and Parallel Execution of Independent Instructions", IEEE Transactions on Computers, vol. C–19, No. 10, Oct. 1970 11–889–895.*

Capozzi et al, "Non–Sequential High–Performance Processing", IBM Technical Disclosure Bulletin, vol. 27, No. 5, 10/84 pp. 2842–2844.*

Ramon D. Acosta et al, "An Instruction Issuing Approach to Enhancing Performance in Multiple Functional Unit Processors", IEEE 8/86 pp. 815–828.*

David R. Ditzel et al., "The Hardware Architecture of the CRISP Microprocessor", ACM, 0084–7495, pp. 309–319.*

* cited by examiner

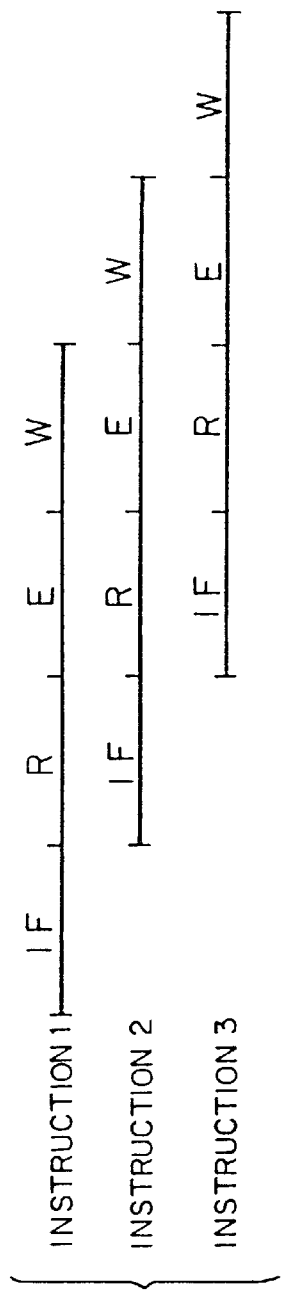
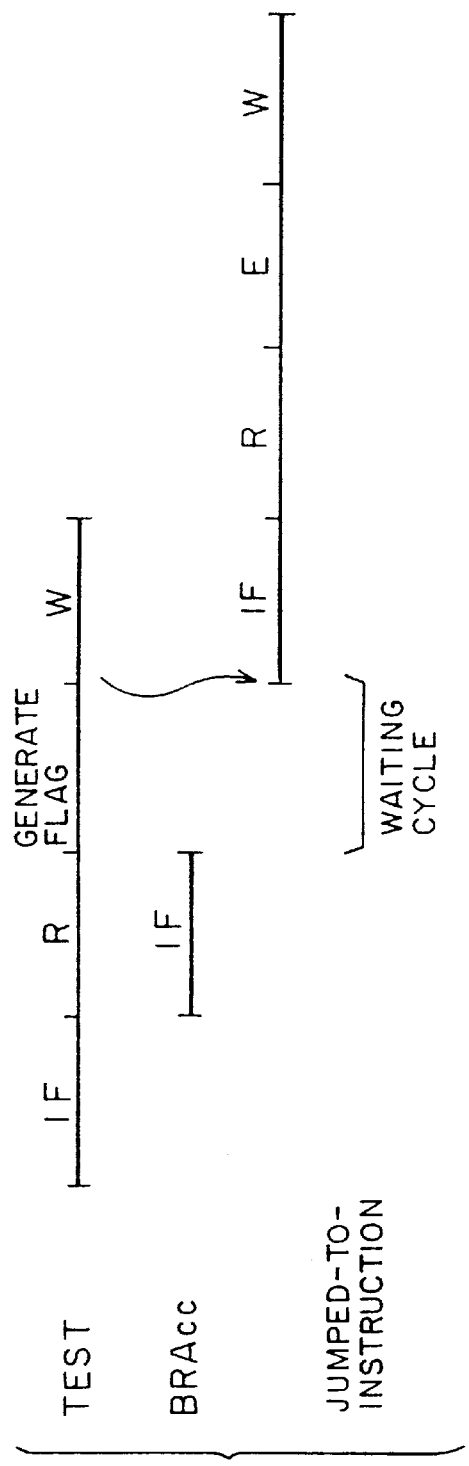

FIG. 9

| TYPES | MNEMONIC | OPERATION |
|---|---|---|
| BASIC INSTRUCTION | ADD R(S1), R(S2), R(D) | R(S1)+R(S2)→R(D) |
| | SUB   // | R(S1)−R(S2)→R(D) |
| | AND   // | STORE LOGICAL PRODUCT OF EACH BITS OF R(S1), R(S2) IN R(D) |
| | OR    // | STORE LOGICAL SUM OF EACH BITS OF R(S1), R(S2) IN R(D) |
| | EOR   // | STORE EXCLUSIVE OR OF EACH BITS OF R(S1), R(S2) IN R(D) |
| | NOT R(S1), R(D) | STORE LOGICAL NOT OF EACH BIT OF R(S1) IN R(D) |
| | SFT R(S1), R(S2), R(D) | SHIFT R(S1) BY BIT NUMBER INDICATED BY R(S2) AND STORE IN R(D) |
| | | |
| | NOP | DO NOTHING |
| BRANCH INSTRUCTION | BRA   d | PC+d→PC |
| | BRAcc d | |
| | CALL  d | PC→R(O), PC+d→PC |
| | RTN   d | R(O)→PC |
| LOAD STORE INSTRUCTION | STOR R(S1), R(S2) | WRITE R(S1) IN MEMORY POINTED BY R(S2) |
| | LOAD R(S1), R(D) | WRITE DATA OF MEMORY POINTED BY R(S1) IN R(D) |

FIG. 10
1. BASIC INSTRUCTION
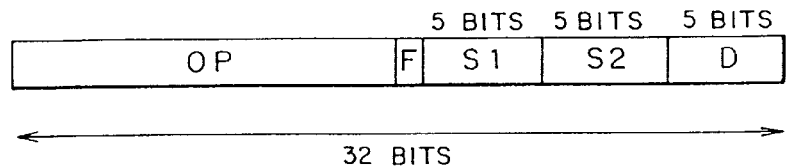
2. BRANCH INSTRUCTION
BRA, CALL
RTN
BRAcc
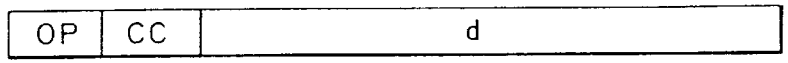
3. LOAD STORE INSTRUCTION
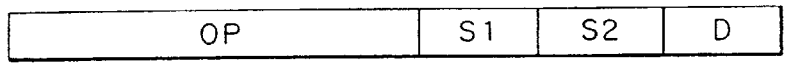
FIG. 11
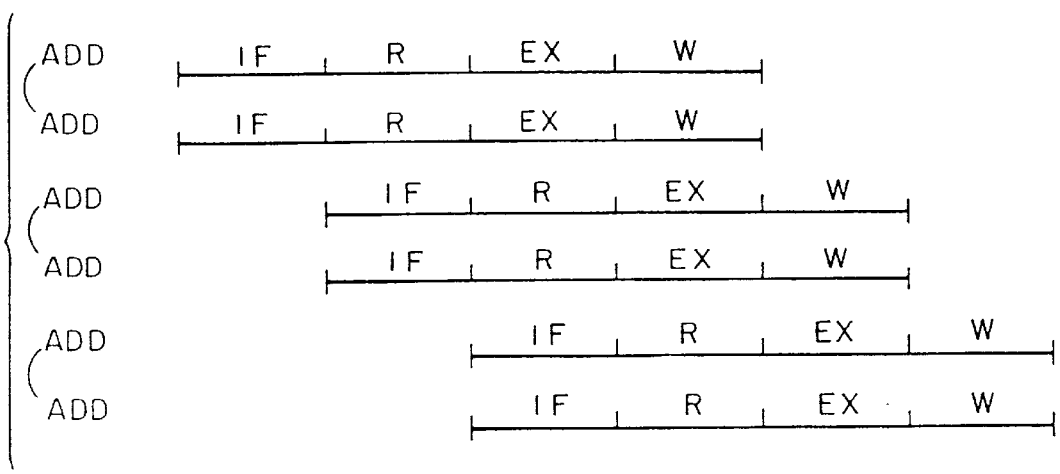

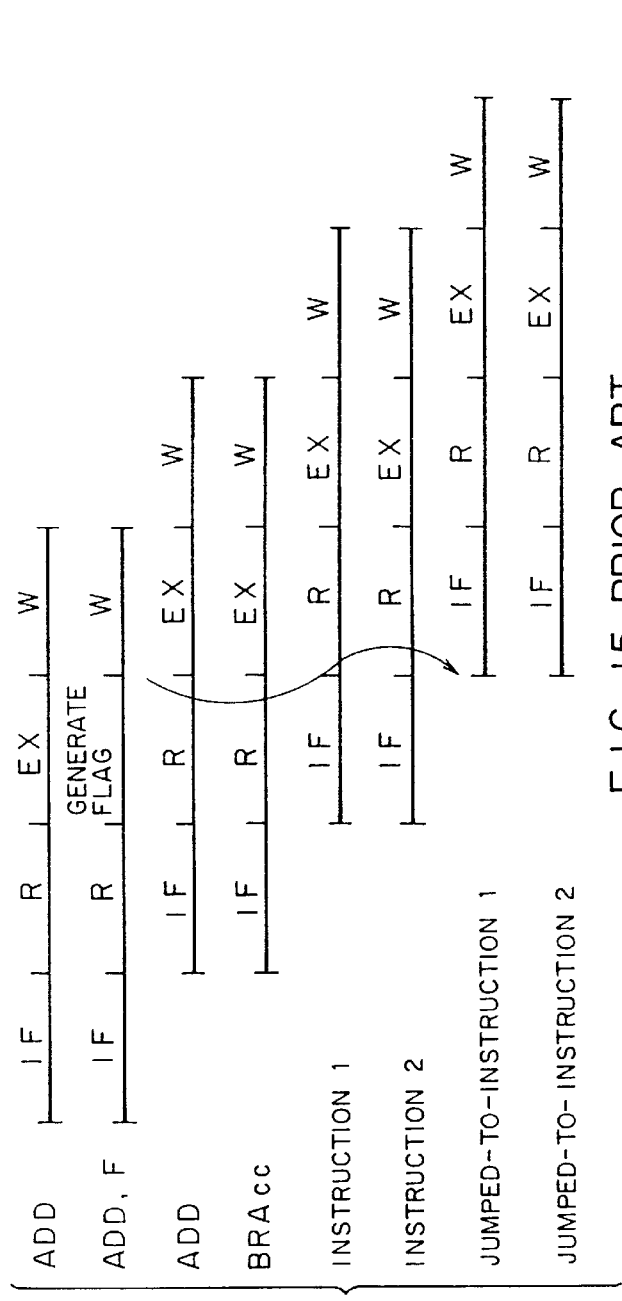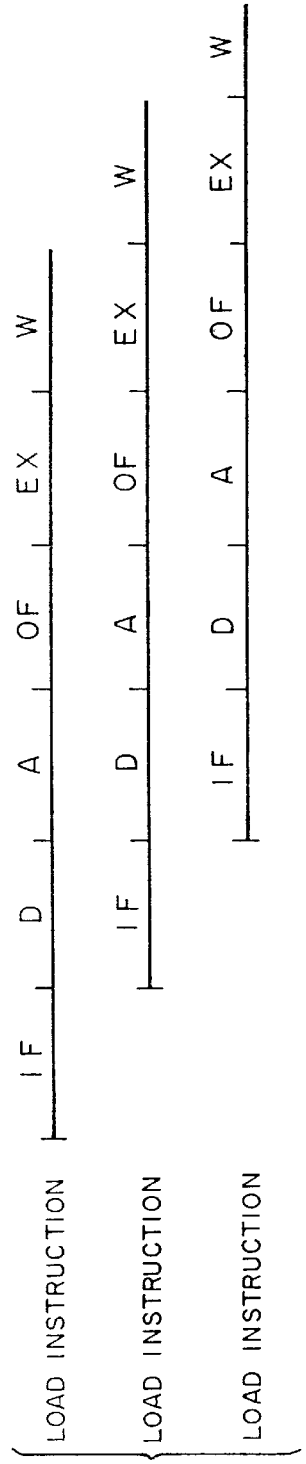

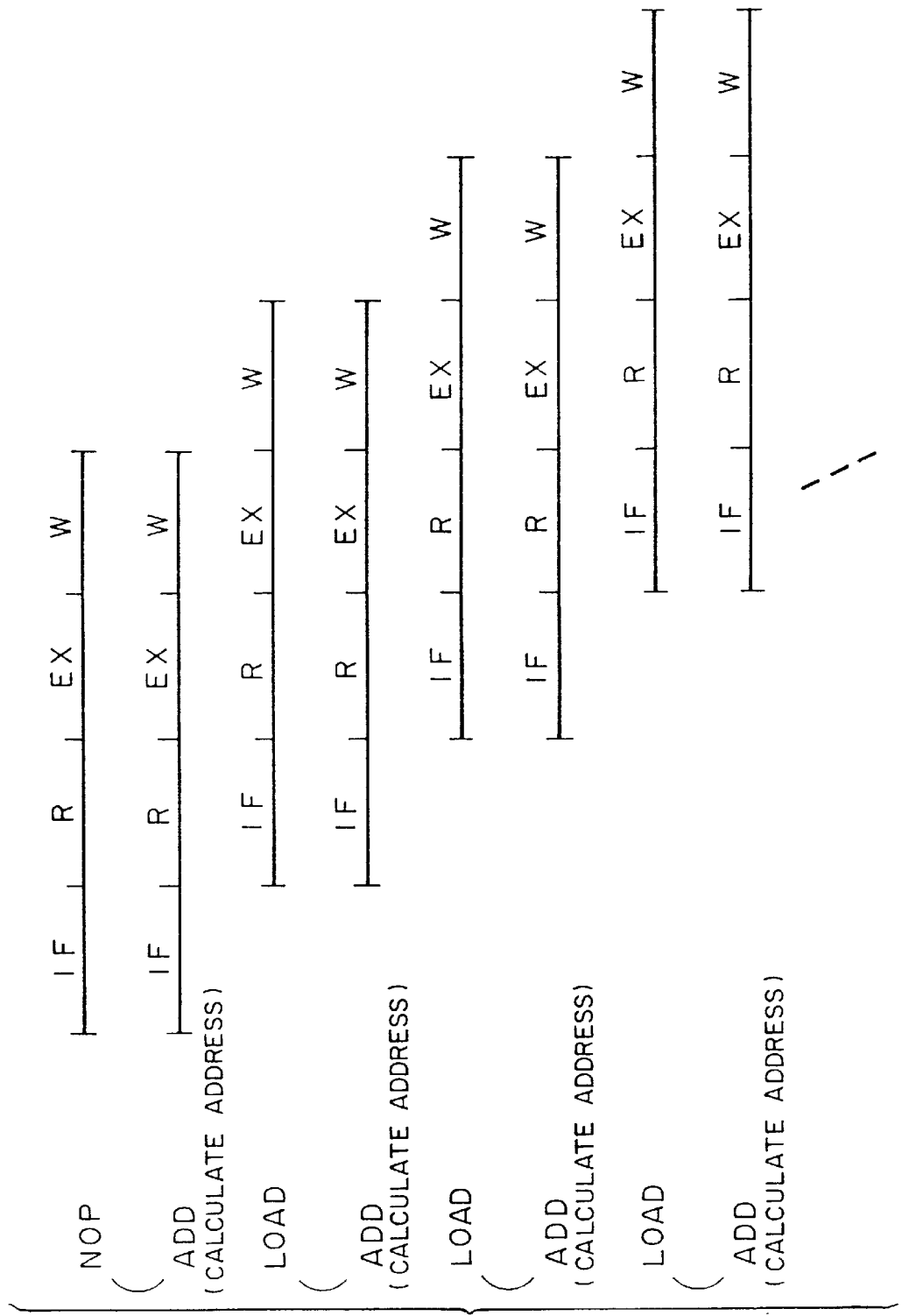

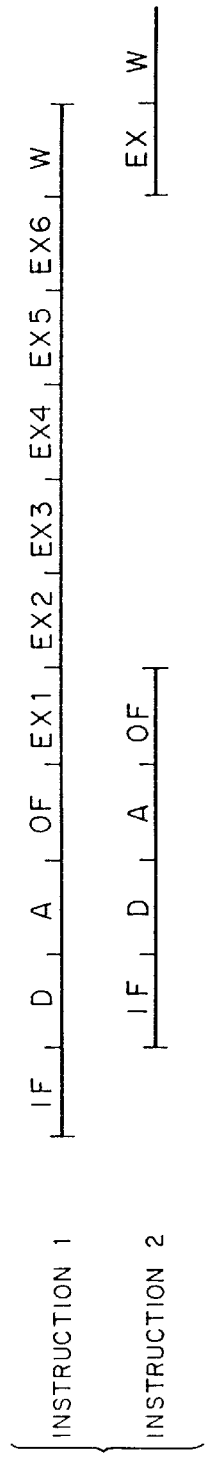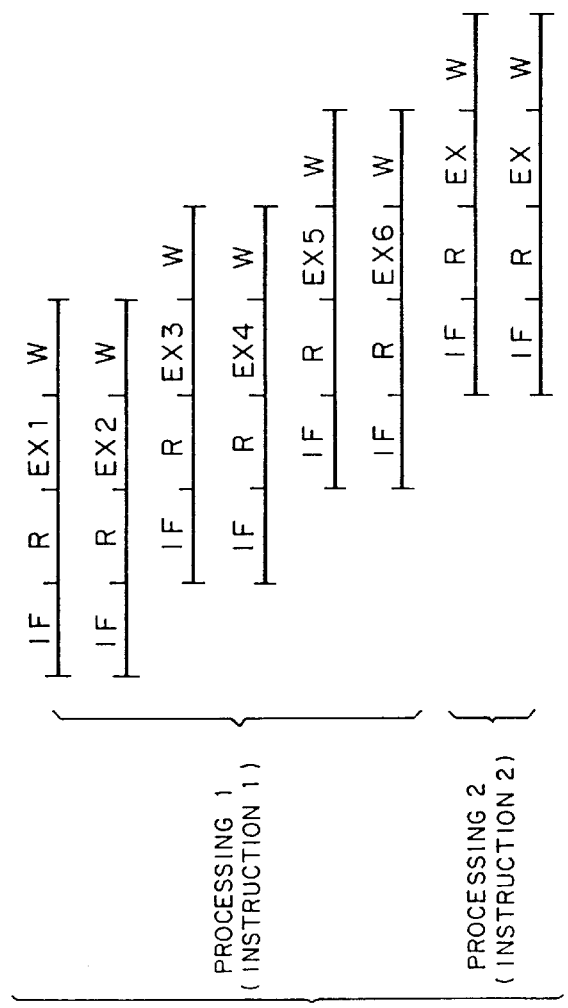

FIG. 22

| ADDRESS | FIRST INSTRUCTION | SECOND INSTRUCTION |
|---|---|---|
| 0 | SFT  R(1), R(2), R(3) | ADD  R(4), R(5), R(6) |
| 2 | SFT  R(7), R(8), R(9) | SFT  R(10), R(11), R(12) |
| 4 | ADD  R(14), R(15), R(16) | ADD  R(17), R(18), R(19) |

↓

| PC | | |
|---|---|---|
| 0 | SFT  R(1), R(2), R(3) | ADD  R(4), R(5), R(6) |
| 2 | SFT  R(7), R(8), R(9) | NOP |
| 3 | SFT  R(10), R(11), R(12) | NOP |
| 4 | ADD  R(14), R(15), R(16) | ADD  R(17), R(18), R(19) |

FIG. 23

| ADDRESS | | |
|---|---|---|
| 0 | SFT  R(1), R(2), R(3) | ADD  R(4), R(5), R(6) |
| 2 | SFT  R(7), R(8), R(9) | NOP |
| 4 | SFT  R(10), R(11), R(12) | NOP |
| 6 | ADD  R(14), R(15), R(16) | ADD  R(17), R(18), R(19) |

FIG. 24

| ADDRESS | FIRST INSTRUCTION | SECOND INSTRUCTION |
|---|---|---|
| 0 | ADD R(1), R(2), R(3) | ADD R(4), R(5), R(6) |
| 2 | LOAD R(3), R(10) | LOAD R(6), R(11) |
| 4 | ADD R(5), R(2), R(3) | ADD R(4), R(1), R(6) |

⇩

| PC | FIRST INSTRUCTION | SECOND INSTRUCTION |
|---|---|---|
| 0 | ADD R(1), R(2), R(3) | ADD R(4), R(5), R(6) |
| 2 | LOAD R(3), R(10) | NOP |
| 3 | LOAD R(6), R(11) | NOP |
| 4 | ADD R(5), R(2), R(3) | ADD R(4), R(1), R(6) |

FIG. 25

| ADDRESS | FIRST INSTRUCTION | SECOND INSTRUCTION |
|---|---|---|
| 0 | ADD R(1), R(2), R(3) | ADD R(4), R(5), R(6) |
| 2 | ADD R(1), R(5), R(8) | ADD R(8), R(9), R(10) |
| 4 | ADD R(12), R(13), R(14) | ADD R(15), R(16), R(17) |

⇩

| PC | FIRST INSTRUCTION | SECOND INSTRUCTION |
|---|---|---|
| 0 | ADD R(1), R(2), R(3) | ADD R(4), R(5), R(6) |
| 2 | ADD R(1), R(5), R(8) | NOP |
| 3 | ADD R(8), R(9), R(10) | NOP |
| 4 | ADD R(12), R(13), R(14) | ADD R(15), R(16), R(17) |

| CONFLICT BIT | LSB OF PC | FIRST INSTRUCTION SIGNAL 115 | SECOND INSTRUCTION SIGNAL 117 |
|---|---|---|---|
| 0 | 0 | FIRST INSTRUCTION | SECOND INSTRUCTION |
| 0 | 1 | NOP | SECOND INSTRUCTION |
| 1 | 0 | FIRST INSTRUCTION | NOP |
| 1 | 1 | SECOND INSTRUCTION | NOP |

DATA PROCESSOR FOR THE PARALLEL PROCESSING OF A PLURALITY OF INSTRUCTIONS

This application is a Continuation of application Ser. No. 07/433,368, filed Nov. 8, 1989 now U.S. Pat. No. 5,233,694.

BACKGROUND OF THE INVENTION

This invention relates to CPUs, such as in minicomputers or microcomputers, and particularly to a data processor suitable for use in high speed operation.

Hitherto, various means have been devised for the high speed operation of computers. The typical one is a pipeline system. The pipeline system does not complete the processing of one instruction before execution of the next instruction is started, but performs the execution of instructions in a bucket-relay manner such that, when the execution of one instruction which is divided into a plurality of stages is going to enter into the second stage, execution of the first stage of the next instruction, which is similarly divided into a plurality of stages, is started. This system is described in detail in the book "ON THE PARALLEL COMPUTER STRUCTURE", written by Shingi Tomita, published by Shokodo, pages 25 to 68. By use of the n-stage pipeline system, it is possible to execute n instructions along all stages at the same time and complete the processing of one instruction at each pipeline pitch with one instruction being processed at each pipeline stage.

It is well known that the instruction architecture of a computer has a large effect on the processing operation and the process performance. From the instruction architecture point of view, the computer can be grouped into the categories CISC (Complex Instruction Set Computer) and RISC (Reduced Instruction Set Computer). The CISC processes complicated instructions by use of microinstructions, while the RISC treats simple instructions, and instead performs high speed computation using hard wired logic control without use of microinstructions. Now, we will describe the summary of the hardware and the pipeline operation of both the conventional CISC and RISC.

FIG. 2 shows the general construction of the CISC-type computer. There are shown a memory interface 200, a program counter (PC) 201, an instruction cache 202, an instruction register 203, an instruction decoder 204, an address calculation control circuit 205, a control storage (CS) 206 in which microinstructions are stored, a microprogram counter (MPC) 207, a microinstruction register 208, a decoder 209, a register MDR (Memory Data Register) 210 which exchanges data with the memory, a register MAR (Memory Address Register) 211 which indicates the operand address in the memory, an address adder 212, a register file 213, and an ALU (Arithmetic Logical Unit) 214.

The operation of the computer will be mentioned briefly. The instruction indicated by the PC 201 is taken out by the instruction cache and supplied through a signal 217 to the instruction register 203 where it is set. The instruction decoder 204 receives the instruction through a signal 218 and sets the head address of the microinstruction through a signal 220 in the microprogram counter 207. The address calculation control circuit 205 is ordered through a signal 219 to process the way to calculate the address. The address calculation control circuit 205 reads the register necessary for the address calculation, and controls the address adder 212. The contents of the register necessary for the address calculation are supplied from the register file 213 through buses 226, 227 to the addres adder 212. On the other hand, a microinstruction is read from the CS 206 at every machine cycle, and is decoded by the decoder 209 and used to control the ALU 214 and the register file 213. In this case, a control signal 224 is supplied thereto. The ALU 214 calculates data fed from the register through buses 228, 229, and again stores it in the register file 213 through a bus 230. The memory interface 200 is the circuit used for exchanging data with the memory such as fetching of instructions and operands.

The pipeline operation of the computer shown in FIG. 2 will be described with reference to FIGS. 3, 4 and 5. The pipeline is formed of six stages. At the IF (Instruction Fetch) stage, an instruction is read by the instruction cache 202 and set in the instruction register 203. At the D (Decode) stage, the instruction decoder 204 performs decoding of the instruction. At the A (Address) stage, the address adder 212 carries out the calculation of the address of the operand. At the OF (Operand Fetch) stage, the operand of the address pointed to by the MAR 211 is fetched through the memory interface 200 and set in the MDR 210. At the EX (Execution) stage, data is read by the register file 213 and the MDR 210, and fed to the ALU 214 where it is calculated. At the last W (Write) stage, the calculation result is stored through the bus 230 in one register of the register file 213.

FIG. 3 shows the continuous processing of add instruction ADDs as one basic instruction. At each machine cycle, one instruction is processed, and the ALU 214 and address adder 212 operate in parallel.

FIG. 4 shows the processing of the conditional branch instruction BRAcc. A flag is produced by the TEST instruction. FIG. 4 shows the flow at the time when the condition is met. Since the flag is produced at the EX stage, three-cycles of waiting times are necessary until the jumped-to-instruction is fetched and the greater the number of stages, the greater will be the waiting cycle count, resulting in a bottleneck in the performance enhancement.

FIG. 5 shows the execution flow of a complicated instruction. The instruction 1 is the complicated instruction. The complicated instruction requires a great number of memory accesses as in the string copy and is normally processed by extending the EX stage many times. The EX stage is controlled by the microprogram. The microprogram is accessed once per machine cycle. In other words, the complicated instruction is processed by reading the microprogram a plurality of-times. At this time, since one instruction is processed at the EX stage, the next instruction (the instruction 2 shown in FIG. 5) is required to wait. In such case, the ALU 214 operates at all times, and the address adder 212 idles.

The RISC-type computer will hereinafter be described. FIG. 6 shows the general construction of the RISC-type computer. There are shown a memory interface 601, a program counter 602, an instruction cache 603, a sequencer 604, an instruction register 605, a decoder 606, a register file 607, an ALU 608, an MDR 609, and an MAR 610.

FIG. 7 shows the process flow for the basic instructions. At the IF (Instruction Fetch) stage, the instruction pointed to by the program counter 602 is read by the instruction cache and set in the instruction register 605. The sequencer 604 controls the program counter 602 in response to an instruction signal 615 and a flag signal 616 from the ALU 608. At the R (Read) stage, the contents of the instruction pointer register is transferred through buses 618, 619 to the ALU 608. At the E (Execution) stage, the ALU 608 performs an arithmetic operation. Finally at the W (Write) stage, the calculated result is stored in the register file 607 through a bus 620.

In the RISC-type computer, the instruction is limited only to the basic instruction. The arithmetic operation is made only between the registers, and the instruction including operand-fetch is limited to the load instruction and the store instruction. The complicated instruction can be realized by a combination of basic instructions. Without use of the microinstruction, the contents of the instruction register 605 are decoded directly by the decoder 606 and used to control the ALU 608 and so on.

FIG. 7 shows the process flow for a register-to-register arithmetic operation. The pipeline is formed of four stages since the instruction is simple.

FIG. 8 shows the process flow at the time of a conditional branch. As compared with the CISC-type computer, the number of pipeline stages is small, and thus the waiting cycle time is only one cycle. In this case, in addition to the inter-register operation, it is necessary to load the operand from the memory and store the operand in the memory. In the CISC-type computer, the loading of the operand from the memory can be performed in one machine cycle because of the presence of the address adder, while in the RISC-type computer shown in FIG. 6, the load instruction requires two machine cycles because it is decomposed into an address calculation instruction and a load instruction.

The problems with the above-mentioned prior art will be described briefly. In the CISC-type computer, although the memory-register instruction can be executed in one machine cycle because of the presence of the address adder, the overhead at the time of branching is large because of the large number of pipeline stages. Moreover, only the E stage is repeated when a complicated instruction is executed, and, as a result, the address adder-idles.

In the RISC-type computer, the overhead at the time of branching is small because of the small number of pipeline stages. However, for the memory-register operation without use of an address adder, two instructions are required, including the load instruction and the inter-register operation instruction.

SUMMARY OF THE INVENTION

Accordingly, it is a first object of this invention to provide a data processor capable of making. effective use of a plurality of arithmetic operation units to enhance the processing ability.

It is a second object of this invention to provide a data processor capable of reducing the overhead at the time of branching.

It is a third object of this invention to provide a data processor capable of reducing the processing time for a complicated instruction for the memory-register operation.

The above objects can be achieved by providing a plurality of arithmetic operation units sharing the register file, simplifying the instructions to decrease the number of pipeline stages and reading a plurality of instructions in one machine cycle-,to control the plurality of arithmetic operation units.

According to the preferred embodiments of this invention, the complex instruction is decomposed into basic instructions, and a plurality of instructions are read at one time in one machine cycle and executed, so that the plurality of arithmetic operation units can be simultaneously operated, thereby to enhance the processing ability.

Moreover, since the function of the instruction is simple, and since the number of pipeline stages can be decreased, the overhead at the time of branching can be reduced.

Furthermore, since the plurality of arithmetic operation units are operated in parallel, the processing time for the complicated instruction can be reduced.

BRIEF DESCRIPTION OF THE DRAWINGS

FIGS. 7 and 8 are timing charts for the operation thereof.

FIG. 9 shows the list of instructions to be used in one embodiment of this invention.

FIG. 10 shows the format of the instruction associated with the embodiment of this invention.

FIGS. 11 to 14 are timing charts for the operation of the embodiment of this invention.

FIG. 15 is a timing chart for the operation of the conventional example.

FIGS. 16 to 18 are timing charts for the operation of the embodiment of this invention.

FIGS. 22 to 25 are diagrams useful for explaining the embodiment of this invention shown in FIG. 1.

DESCRIPTION OF THE PREFERRED EMBODIMENTS

One embodiment of this invention will be described.

FIG. 9 is the list of instructions to be executed by the processor in accordance with this embodiment. The basic instructions are all executed by the inter-register operation. The branch instructions include four branch instructions: an unconditional branch instruction BRA, a conditional branch instruction BRAcc (cc indicates the branch condition), a branch-to-subroutine instruction CALL, and a return-from-subroutine instruction RTN. In addition to these instructions, a load instruction LOAD and a store instruction STORE are provided. For convenience of explanation, the data format is only a 32 bits whole number, although it is not limited thereto. The address has 32 bits (4 bytes) for each instruction. For the sake of simplicity, the number of instructions are limited as above, but may be increased as long as the contents can be processed in one machine cycle.

FIG. 10 shows the instruction format. The instructions all have a fixed length of 32 bits. The F, S1, S2, and D fields of the basic instruction are, respectively, the bit or bits indicating whether the arithmetic operation result should be reflected on the flag, the field for indicating the first source register, the field for indicating the second source register, and the field for indicating the destination register.

Figure 1:
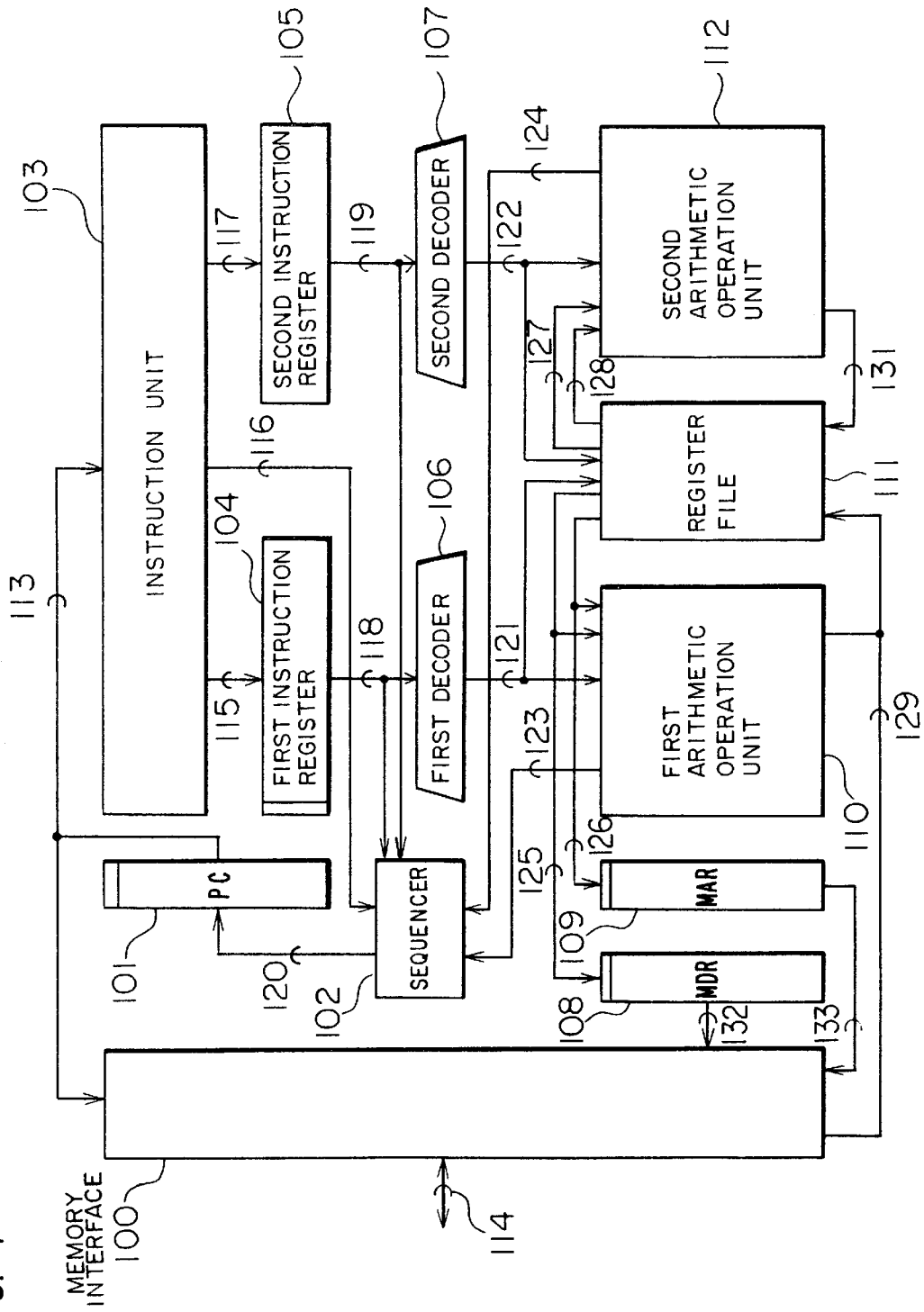
FIG. 1 is a block diagram of the whole construction of one embodiment of this invention.
Figure 2:
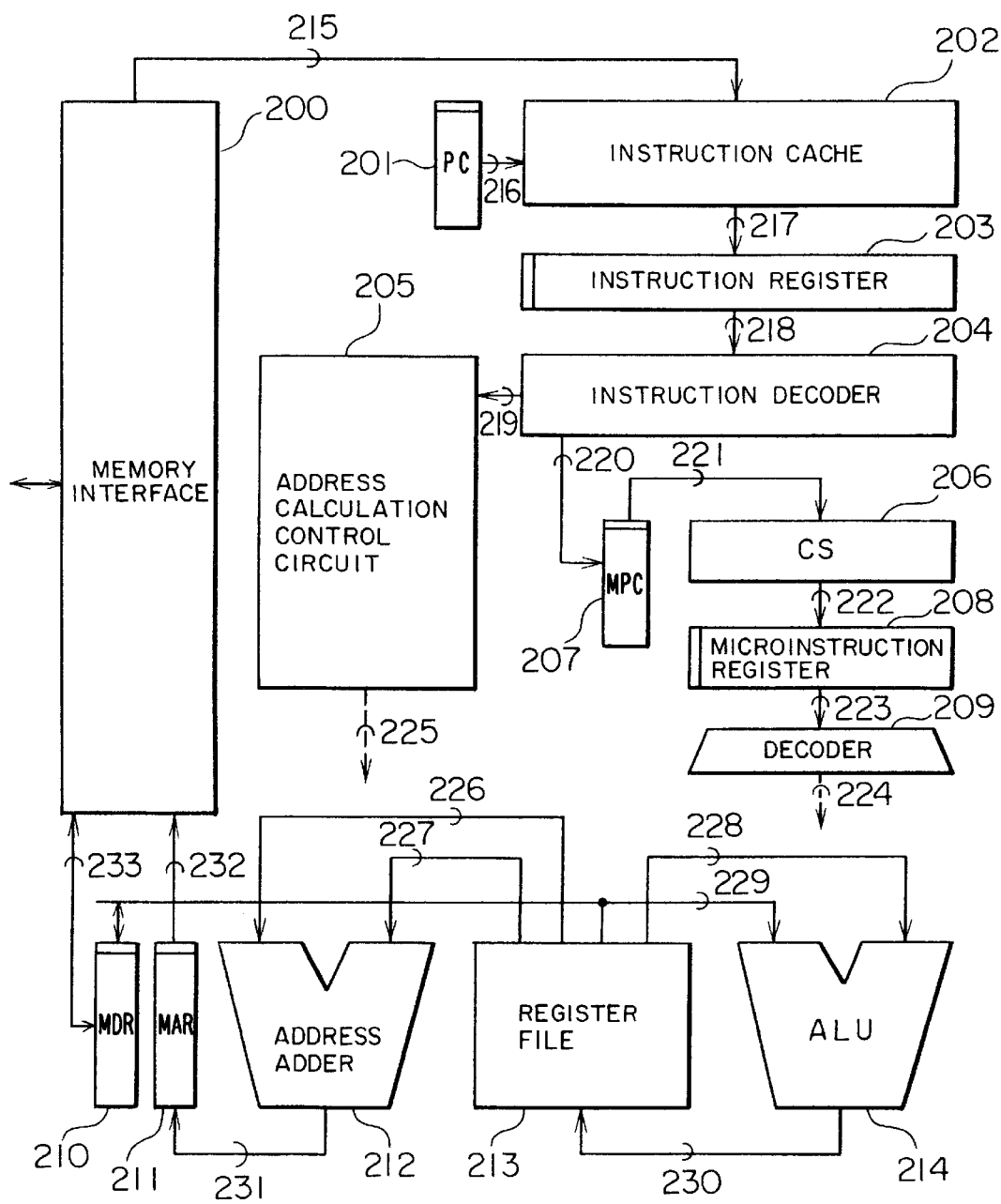
FIG. 2 is a block digram of the whole construction of a conventional example.
Figure 3:
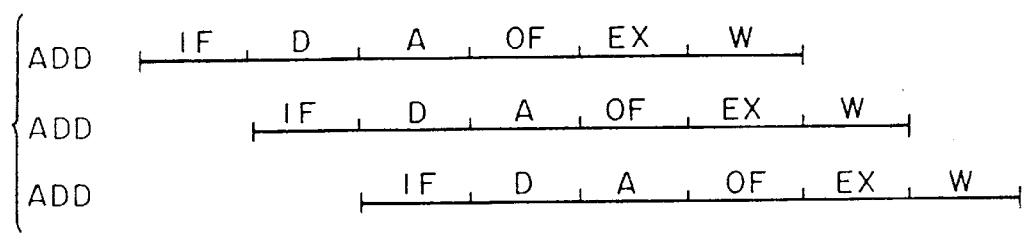
FIGS. 3 to 5 are timing charts for the operation thereof.
Figure 4:
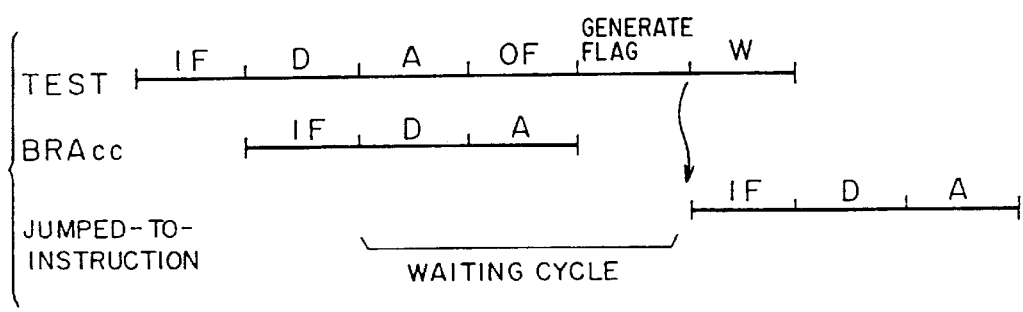
Figure 5:
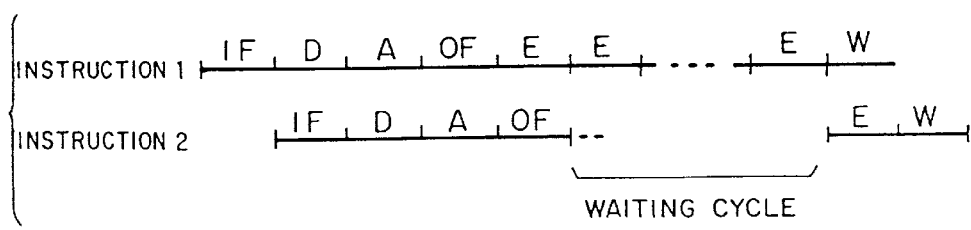
Figure 6:
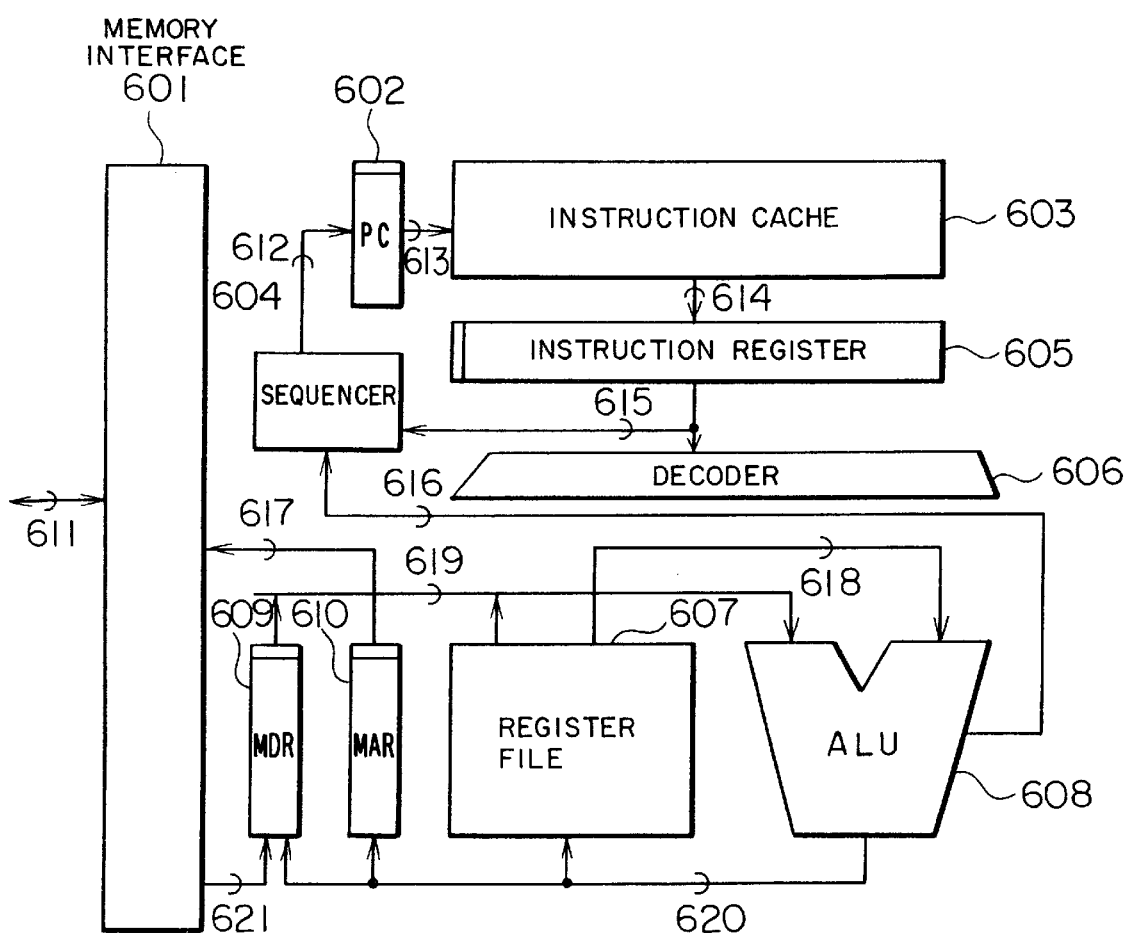
FIG. 6 is a block diagram of the whole construction of another conventional example.

FIG. 1 shows the construction of this embodiment. There are shown a memory interface 100, a 32-bit program counter 101, a sequencer 102, an instruction unit 103, a 32-bit first instruction register 104, a 32-bit second instruction register 105, a first decoder 106, a second decoder 107, an MDR 108, an MAR 109, a first arithmetic operation unit 110, a register file 111, and a second arithmetic operation unit 112.

In this emodiment, two instructions are read and executed in parallel in one machine cycle. FIGS. 11 to 14 show the pipeline processing in this embodiment. The pipeline comprises four stages, including IF (Instruction Fetch), R (Read), EX (Execution), W (Write).

The operation of this embodiment-will be described with reference to FIG. 1.

At the IF stage, two instructions pointed to by the program counter are read, and set in the first and second instruction registers 104 and 105 through buses 115 and 117, respectively. When the content of the PC is even, the instruction at the PC address is stored in the first instruction register and the instruction at PC+1 address is stored in the second instruction register. When the PC indicates odd, the NOP instruction is set in the first instruction register, and the instruction at the PC address is set in the second instruction register. The sequencer 102 is the circuit for controlling the program counter. When the first and second instruction registers both indicate no branch instruction, the program counter is incremented to the previous count+2. At the time of branching, the branch address is computed and set in the program counter. When the conditional branch occurs, a decision is made as to whether the branch should be made or not on the basis of the flag information 123 from the first arithmetic operation unit and the flag information 124 from the second arithmetic operation unit. The signal 116 fed from the instruction unit is the conflict signal indicative of various different conflicts between the first and second instructions.

When the conflict signal is asserted, the conflict is controlled to be avoided by the hardware. The method of avoiding conflicts will be described in detail later.

The operation of the R stage at the time of processing the basic instruction will be mentioned below. At the R stage, the content of the first instruction register 104 is decoded by the first decoder 106, and the content of the second instruction register 105 is decoded by the second decoder 107. As a result, the content of the register pointed to by the first source register field S1 of the first instruction register 104 is fed to the first arithmetic operation unit 110 through a bus 125, and the content of the register pointed to by the second source register field S2 is fed through a bus 126 thereto. Moreover, the content of the register pointed by the first source register field S1 of the second instruction register is fed through a bus 127 to the second arithmetic operation unit 112, and the content of the register pointed by the second source register field S2 is fed through a bus 128 thereto.

The operation of the EX stage will hereinafter be described. At the EX stage, the first arithmetic operation unit 110 performs an arithmetic operation for the data fed through the buses 125 and 126 in accordance with the OP code of the first instruction register. At the same time, the second arithmetic operation unit 112 performs an arithmetic operation for the data fed through the buses 127 and 128 in accordance with the OP code of the second instruction register 105.

Finally, the operation of the W stage will be mentioned below. At the W stage, the result of the arithmetic operation of the first arithmetic operation unit 110 is stored through a bus 129 in the register pointed to by the destination field D of the first instruction register. Also, the result of the arithmetic operation of the second operation unit 112 is stored through a bus 131 in the register pointed to by the destination field D of the second instruction register.

FIG. 11 shows the flow chart for the continuous processing of basic instructions. Two instructions are processed at a time in one machine cycle. In this example, the first arithmetic operation unit and the second arithmetic operation unit are always operated in parallel.

Figure 12:
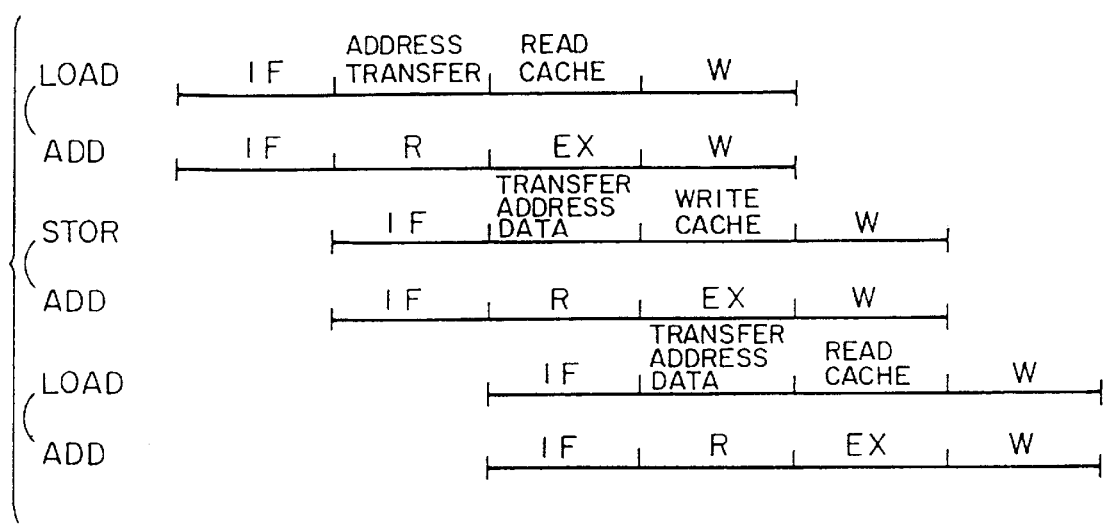

FIG. 12 is the flow chart for the continuous processing of either a load or a store instruction as a first instruction, and the basic instruction as a second instruction. When the load instruction is executed, at the R stage the content of the register specified by the S2 field of the first instruction register is transferred through the bus 126 to the MAR 109. At the EX stage, the operand is fetched through the memory interface 100. Finally, the operand fetched at the W stage is stored through the bus 129 in the register specified by the destination field D of the first instruction register.

At the EX stage, the operand can be fetched in one machine cycle if a high speed cache is provided in the memory interface. Particularly, it can be easily made if the whole computer shown in FIG. 1 is integrated in a semiconductor substrate with the instruction cache and data cache provided on the chip. Of course, when a miss occurs in the cache, the operand fetch cannot be finished in one machine cycle. In such case, the system clock is stopped, and the EX stage is extended. This operation is also performed in the conventional computer.

When the store instruction is executed, at the R state the content of the register pointed to by the first source register field S1 of the first instruction register is transferred as data through the bus 125 to the MDR 108. At the same time, the content of the register pointed by the second source register field S2 of the first instruction register is transferred as address through the bus 126 to the MAR 109. At the EX stage, the data within the MDR 108 is written in the address pointed by the MAR 109.

As shown in FIG. 12, even if the load instruction or the store instruction is the first instruction, two instructions can be processed at one time in one machine cycle. The case where the load instruction or the store instruction appears as the second instruction will be mentioned in detail later.

Figure 13:
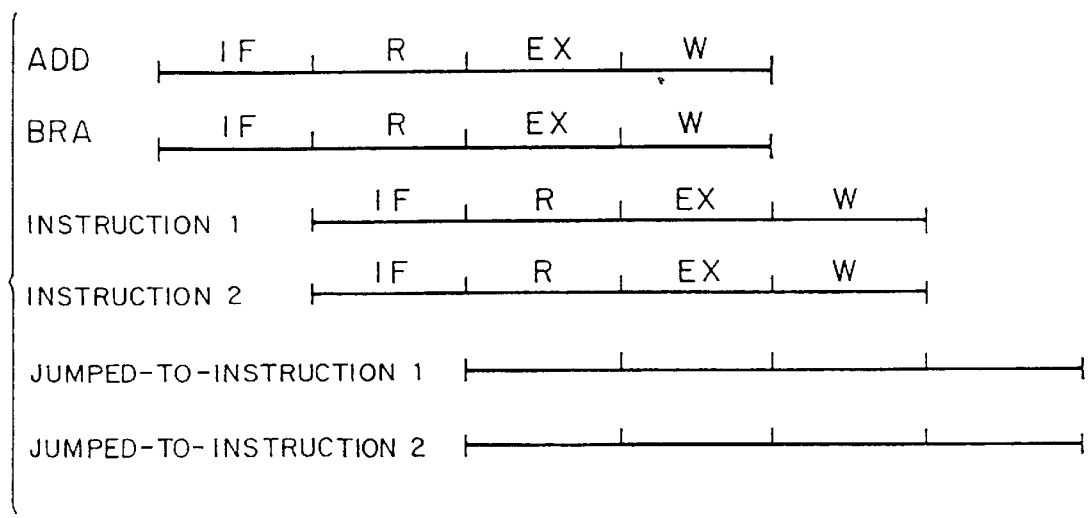

FIG. 13 shows the process flow for the execution of the unconditional jump BRA instruction as the second instruction. When the BRA instruction is read, at the R stage the sequencer 102 performs the addition between the displacement field d and the value in the program counter, and sets it in the program counter 101. During this time, the instruction next to the address of the BRA instruction and the further next instruction are read (the instructions 1 and 2 shown in FIG. 13). In the next cycle, two instructions at the addresses to which the program has jumped are read. In this embodiment, the hardware is able to execute the instructions 1 and 2. In other words, no waiting cycle occurs even at the time of processing the jump instruction. This approach is called a delay branch is used in the conventional RISC-type computer. However, in the conventional RISC-type computer, only one instruction can be executed during the computation of the address of the jump instruction. In this embodiment, two instructions can be executed at one time during the computation of the address of the jump instruction, thus providing a higher processing ability. The same is true for the processing flow of the CALL instruction and the RTN instruction. The compiler produces the codes so that as many instructions as possible can be executed during the computation of the address of the branch instruction, but when there is nothing to do, the instructions 1 and 2 shown in FIG. 13 are made NOP instructions. At this time, substantially one machine cycle waiting occurs. However, since the number of pipeline stages is small, the overhead at the time of branching can be reduced as compared with the CISC-type computer mentioned in the conventional example.

FIG. 14 shows the processing flow of the conditional branch instruction BRAcc. The flag is set by the instruction indicated by ADD, F, and the decision of whether the branch condition is met or not is made according to the result. At this time, similarly as at the time of the unconditional branch instruction processing mentioned with reference to FIG. 13, the instruction next to the address of the BRAcc instruction, the instruction 1 in FIG. 14, the next instruction, and the instruction 2 in FIG. 14 are read and processed. However, at the W stage during the processing flow of the two instructions, the result of the arithmetic operation is written in the register file only when the branch condition of the BRAcc instruction is not satisfied. In other words, when the branch instruction is satisfied, the result of the computation is suppressed from being written.

Thus, as shown in FIGS. 11 to 14, this embodiment processes two instructions at a time during one machine cycle, thus having the merit that the processing ability is enhanced to double, maximum. Moreover, since simple instructions are used and the number of pipeline stages is as small as 4 under the control of wired logic, the overhead at the time of branching can be reduced to one machine cycle, maximum. In addition, if the delay branch is optimized by the compiler, the overhead can be eliminated.

Moreover, since even complicated processings can be executed by a combination of simple instructions, the parallel operations of the first arithmetic operation unit 110 and the second arithmetic operation unit 112 in FIG. 1 can be performed with less idling as compared with that of the address adder and ALU by the parallel pipeline in the conventional CISC-type computer. This aspect will be mentioned a little more. When the load from the memory to the register is repeated, the conventional CISC-type computer, as shown in FIG. 15, is able to load one piece of data at one time during one machine cycle. On the contrary, this embodiment takes two instructions of the address computation ADD instruction and the LOAD instruction using the address for loading a piece of data, but is able to execute two instructions at a time during one machine cycle as shown in FIG. 16, thus still being able to load one piece of data at one time during one machine cycle. From the viewpoint of the parallel operation of arithmetic operation units, both operate two arithmetic operation units in parallel and thus are the same.

FIGS. 17 and 18 show the comparison of further complicated processings. The instruction 1 which, as shown in FIG. 17, takes 6-cycles of processing at the EX stage in the conventional CISC-type computer can be executed in 3 cycles in this embodiment as shown in FIG. 18. This is because in the conventional CISC-type computer, the operation of the address adder is stopped during the execution of the instruction 1, while in this embodiment, two arithmetic operation units can be operated in parallel in each cycle.

Figure 19:
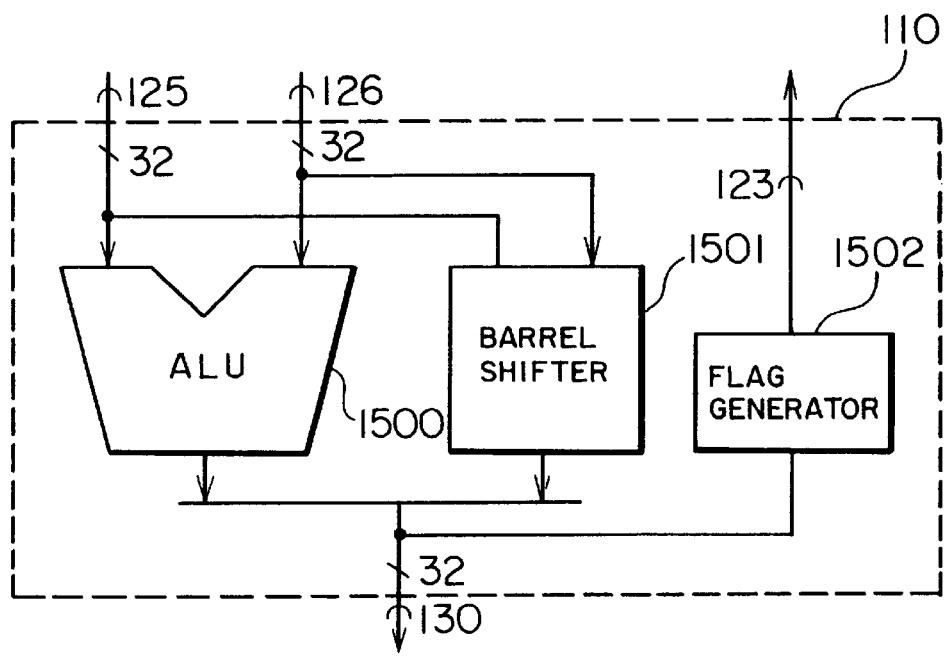
FIG. 19 is a construction diagram of the first arithmetic operation unit 110 in FIG. 1.

FIG. 19 shows the construction of the first arithmetic operation unit 110 shown in FIG. 1. There are shown an ALU 1500, a barrel shifter 1501, and a flag generation circuit 1502. The data transferred through the buses 125 and 126 is processed by the ALU 1500 for addition, subtraction, and logic operation and by the barrel shifter for the SFT instruction. The result of the processing is transmitted to the bus 130. A flag is produced from the flag generation circuit 1502 on the result of the arithmetic operation and fed as the signal 123.

Figure 20:
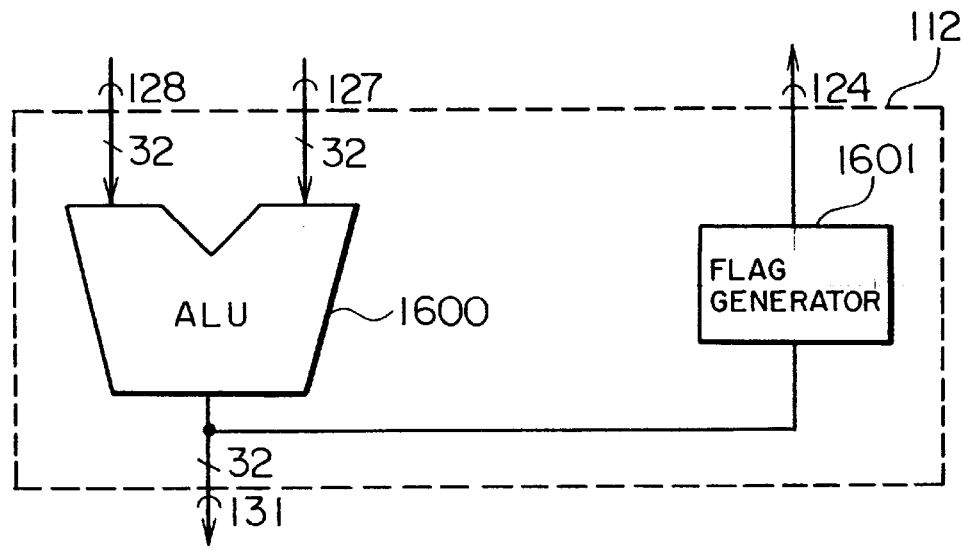
FIG. 20 is a construction diagram of the second arithmetric unit 112 in FIG. 1.

FIG. 20 shows one example of the construction of the second arithmetic operation unit 112 in FIG. 1. There are shown an ALU 1600 and a flag generation circuit 1601. The second arithmetic operation unit is different from the first arithmetic operation unit in that it has no barrel shifter. This is because the SFT instruction occurs less frequently than the arithmetic logic operation instruction. Thus, two SFT instructions cannot be executed in one machine cycle, but there is the merit that the amount of hardware can be reduced. The control method to be used when two SFT instructions appear will be described later. Of course, the second arithmetic unit 112 may be the unit shown in FIG. 19.

Figure 21:
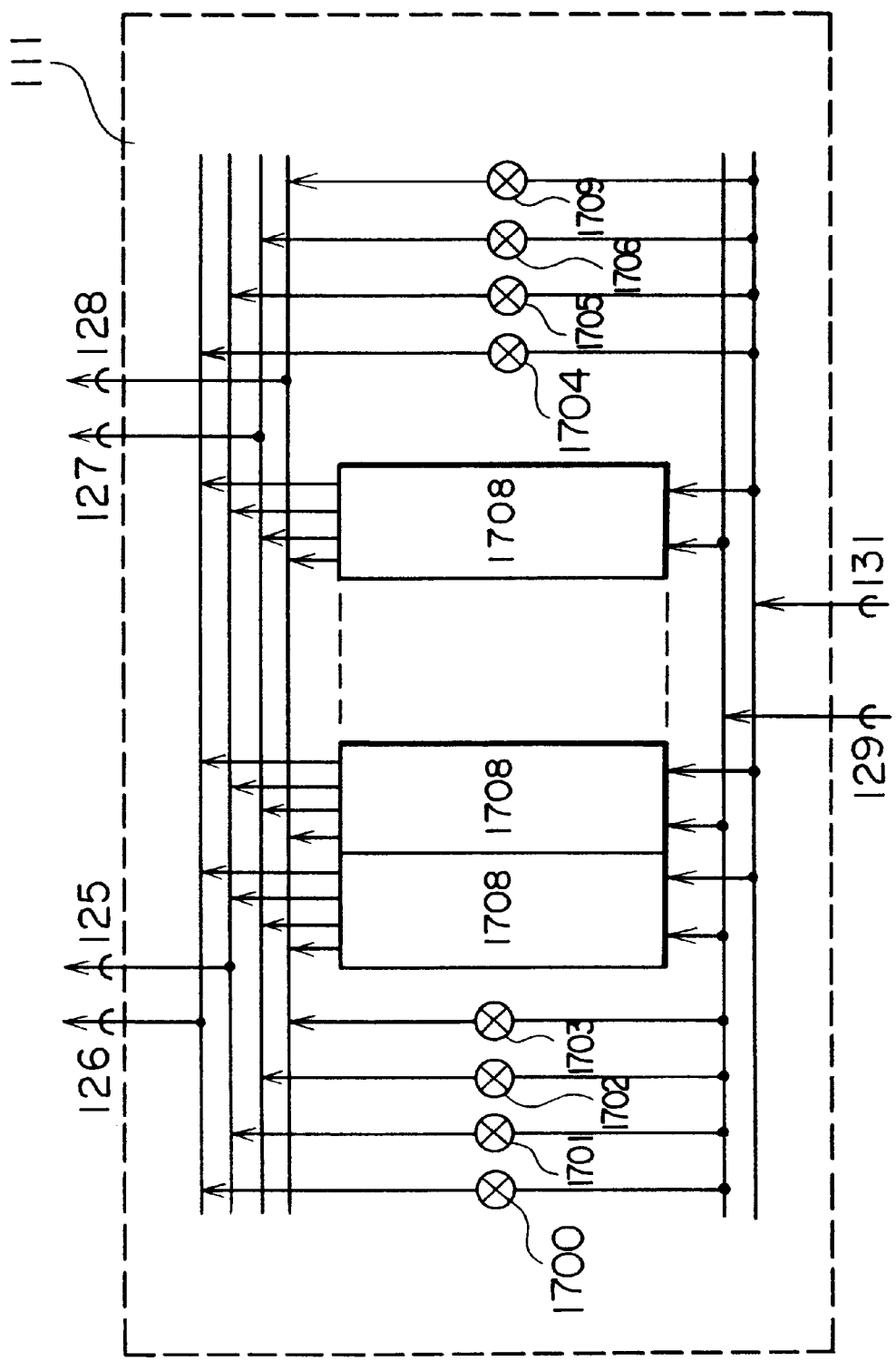
FIG. 21 is a construction diagram of the register file 111 in FIG. 1.

FIG. 21 shows the construction of the register file 111 in FIG. 1. There are shown registers 1708 and bus switches 1700 to 1709. Each register has four read ports and two write ports. The bus switch is used to bypass the register file when the register specified by the destination field of the previous instruction is immediately used for the next instruction. For example, the bus switch 1702 is the bypass switch from the bus 129 to the bus 127, and opens when the destination register field D of the first instruction coincides with the first source register field S1 of the second instruction.

The method of eliminating the conflict between the first and second instructions will be described with reference to FIGS. 22 to 29. Both instructions cannot sometimes be executed at a time depending on a combination of the first and second instructions. This is called a conflict. A conflict occurs in the following cases.

(1) Load or store instruction appears as the second instruction.
(2) SFT instruction appears as the second instruction.
(3) The register pointed to by the destination register field D of the first instruction coincides with the register specified by the first source register field S1 of the second instruction or with the register pointed to by the second source register field S2 of the second instruction.

The above cases (1) and (2) in which the conflict occurs are the problems peculiar to this embodiment which are caused when the load, store instruction and the SFT instruction cannot be processed by the second arithmetic operation unit. If in FIG. 1 the second MDR is added to the bus 127, the second MAR is added to the bus 128, and two pieces of data are accessed in one machine cycle through'the memory interface, then the conflict condition (1) can be eliminated. Moreover, if the barrel shifter is provided in the second arithmetic operation unit, the conflict condition (2) can be eliminated. In this embodiment, the conflict condition occurs because of hardware reduction. In such case, since the conflict can be easily eliminated as described later, only the hardware associated with the instructions to be executed at one time is doubled in accordance with the necessary performance and the allowable amount of hardware, and thus the hardware is reduced with substantially no reduction of performance.

The control method to be used when the SFT instruction appears as the second instruction will be mentioned with reference to FIG. 22.

The upper part of FIG. 22 shows the case where the SFT instruction is located in the address "3" for the second instruction. The lower part of FIG. 22 shows the instructions to be stored in the first and second instruction registers at the time of excution. When the program counter is 2, the hardware detects that the second instruction is the SFT instruction, and the instruction at the address 2 is set in the first instruction register, the NOP instruction being set in the second instruction register. In the next machine cycle, the program counter is incremented by "1", or address 3 is set in the program counter.

Moreover, the SFT instruction at the address 3 is set in the first instruction register, and the NOP instruction in the second instruction register. Thus, the processing can be correctly carried out in two separate machine cycles. Of course, optimization is made by the compiler so that if possible, the SFT instruction is preferably prevented from appearing.

Another method of eliminating the conflict will be described with reference to FIG. 23. The SFT instruction is prevented from being stored in the odd address for the second instruction, and when there is no instruction to be executed, the NOP instruction is stored therein. Thus, the program size is slightly increased, but the hardware for the elimination of the conflict can be omitted.

FIG. 24 shows the processing method to be used when the load instruction appears as the second instruction. The load instruction is stored in the address 3. The processing method is the same as for the SFT instruction.

FIG. 25 shows the processing method to be used when the register conflict occurs. The instruction at the address 2 is stored in the number 8 register, and the instruction at the address 3 reads the same number 8 register. In this case, it is executed in two separate machine cycles as is the SFT instruction.

As to the load, store instruction and register conflict, too, it can be inhibited from being stored in the odd addresses for the purpose of eliminating the conflict. The effect is the same as described for the SFT instruction.

Figures 26, 27:
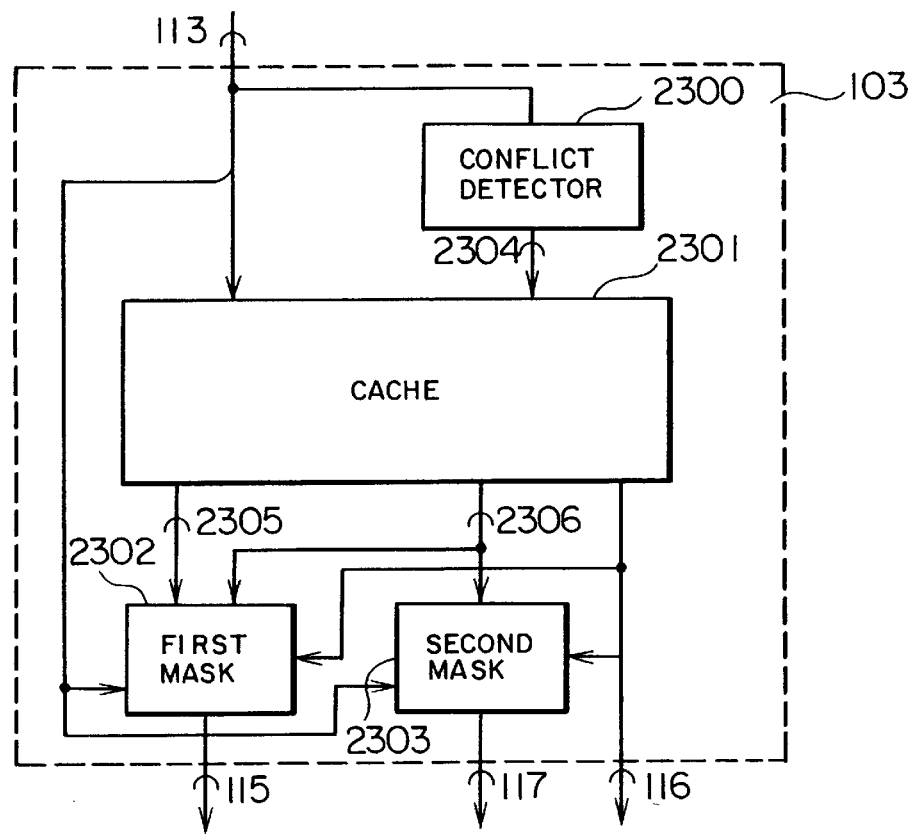
FIG. 26 is a construction diagram of the instruction unit 103 in FIG. 1.
FIG. 27 is a diagram useful for explaining the operation thereof.

A description will be made of the hardware system for realizing the processing system mentioned with reference to FIGS. 22 to 25. FIG. 26 shows the construction of the instruction unit 103 in FIG. 1. There are shown a conflict detection circuit 2300, a cache memory 2301, a first mask circuit 2302, and a second mask circuit 2303. The content of the program counter is, normally, inputted through the bus 113, and the instruction pointed to by the program counter and the instruction at the next address are fed to buses 2305 and 2306. At the time of a cache miss, a instruction is fetched through the memory interface 100, and written through the bus 113 in the cache 2301. At this time, the conflict detection circuit checks if the conflict is present between the first and second instructions. If a conflict is present, the conflict signal 2304 is asserted. In the cache are provided bits each indicating the conflict condition of two instructions. At the time of a cache miss, the conflict signal 2304 is stored therein. The first mask circuit receives the first instruction, the second instruction, the conflict bit, and the least signifi-
cant bit of the program counter, and controls the signal 115 to the first instruction register 104 as shown in FIG. 27. The second mask circuit receives the second instruction, the conflict bit and the least significant bit of the program counter, and still supplies the signal 117 to the second register 105 as shown in FIG. 27.

When as shown in FIG. 27 the conflict bit and the least significant bit of the PC are both 0, the first instruction is fed to the first instruction register, and the second instruction to the second instruction register. This is the operation in the normal case. When the conflict bit is 1, and the least significant bit of the PC is 0, the first instruction is fed to the first instruction register, and the NOP instruction to the second instruction register. This operation is the processing in the first machine cycle at the time of processing the conflict instruction. When the conflict bit is 1, and the least significant bit of the PC is 1, the second instruction is fed to the first instruction register, and the NOP instruction to the second instruction register. This operation is the processing in the second machine cycle at the time of processing the conflict instruction. Thus, the process flow of the conflict instruction mentioned with reference to FIGS. 22, 23, and 25 can be realized by the processing.

When the branch instruction is branched into an odd address, as shown in FIG. 27, only the second instruction is made effective irrespective of the conflict bit and thus correct processing is possible. The cache is read in each cycle, but it is written when the a cache miss occurs, in which case it is made over several machine cycles. Thus, if the conflict detection circuit is operated at the time of writing the cache so that the conflict bit is kept in the cache, the machine cycle can be effectively shortened.

Figure 28:
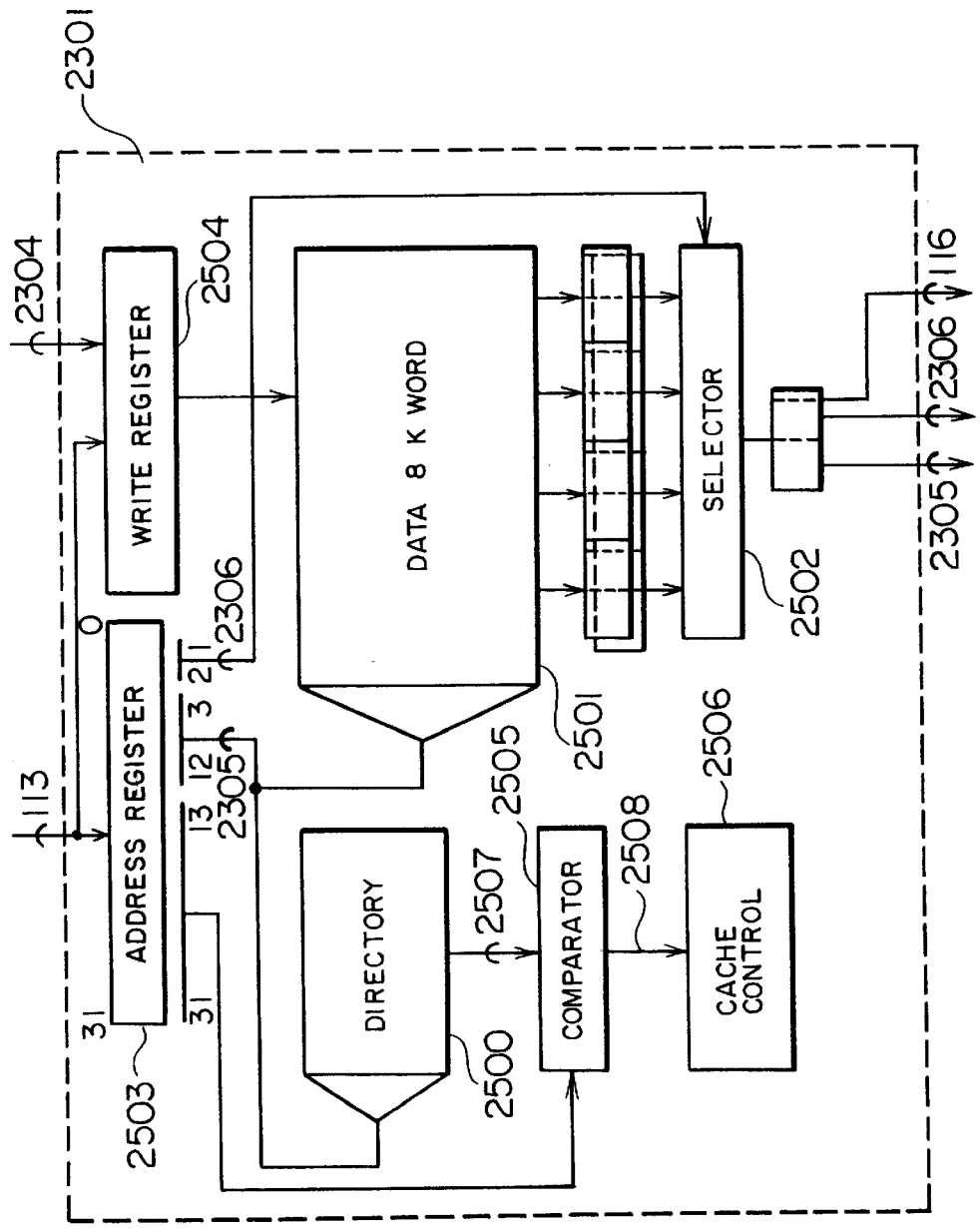
FIG. 28 is a construction diagram of the cache 2301 in FIG. 26.

FIG. 28 shows the construction of the instruction cache 2301 in FIG. 26. There are shown a directory 2500, a data memory 2501, a selector 2502, an address register 2503, a write register 2504, a comparator 2505, and a cache control circuit 2506. The cache in FIG. 28 has substantially the same construction as a normal cache, but it is different in that the data memory 2501 has provided therein a conflict bit holding field for each 2-instruction 8 bytes, and that at the time of reading the cache, the least significant bit (0 bit) of the PC is neglected so that the first instruction 2305, the second instruction 2306 and the conflict signal 116 are fed.

In FIG. 28, the data memory is of 8 K words, and the block size is 32 bytes (8 words). The signal 113 fed from the program counter is set in the address register 2503. The outputs of the directory 2500 and data memory 2501 are indicated by 3 to 12 bits of the address. The comparator 2505 compares the output of the directory and the bits 13 to 31 of the address register. If the result of the comparison is not coincident, a signal 2508 is supplied to the cache control circuit 2506. The cache control circuit 2506 reads a block including the requested instruction from the main memory, and sets it in the data memory 2501. The selector 2502 receives the first and second bits of the address register, and selects two necessary instructions from the block. The first and second instructions are sure to be within the same block, and only one of them is never mis-hitted.

Figure 29:
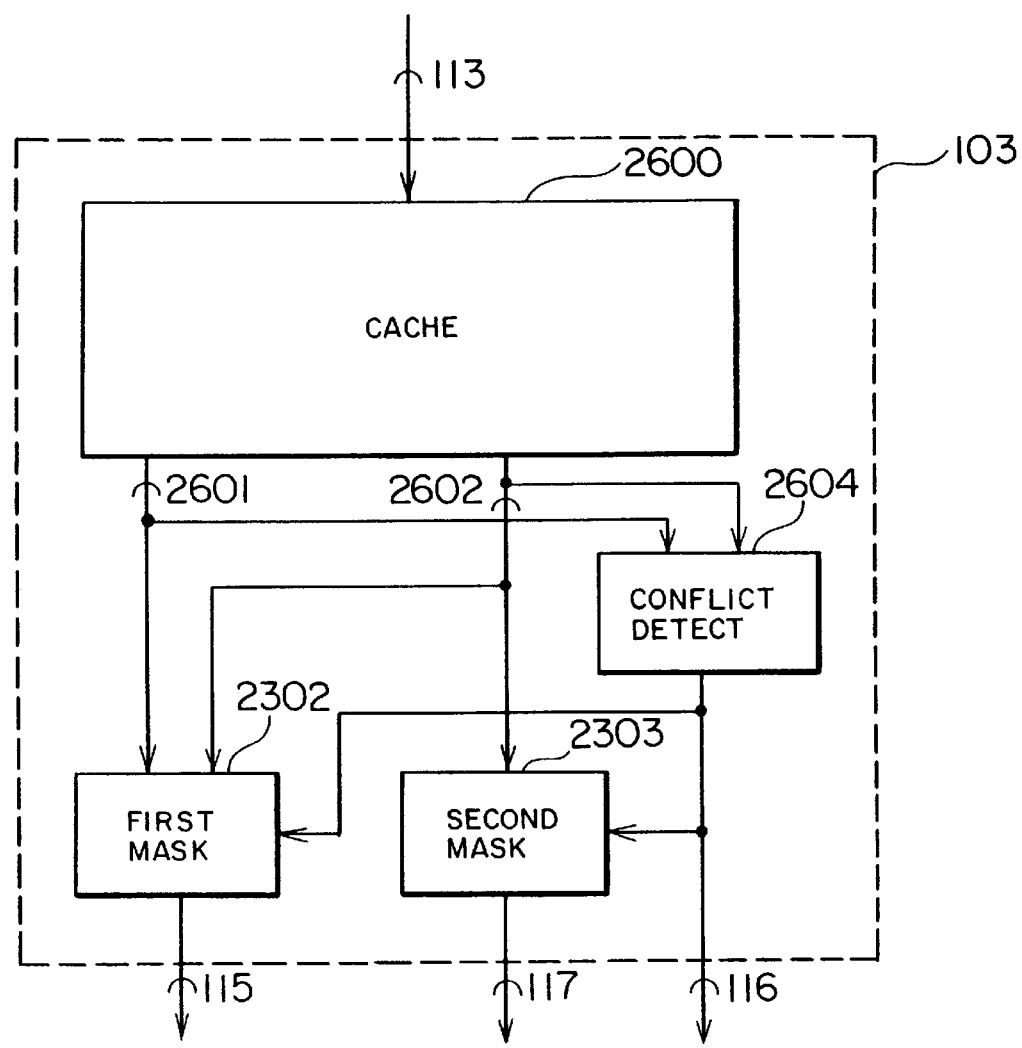
FIG. 29 is another construction diagram of the instruction unit 103 in FIG. 1.

FIG. 29 shows another construction of the instruction unit 103 in FIG. 1. There are shown a cache memory 2600, a conflict detection circuit 2604, a first mask circuit 2302, and a second mask circuit 2303. The construction shown in FIG. 29 is different from that shown in FIG. 26 in that the cache has no field for holding the conflict bit and that the first instruction 2601 and the second instruction 2602 of the cache output are monitored by the cycle conflict detection circuit 2604. The operations of the first mask circuit 2302 and the second mask circuit 2303 is the same as those in FIG. 26. According to this embodiment, since each-cycle conflict detection circuit is operated after reading the cache, the machine cycle is extented, but the conflit bit field may be absent within the cache.

Figure 30:
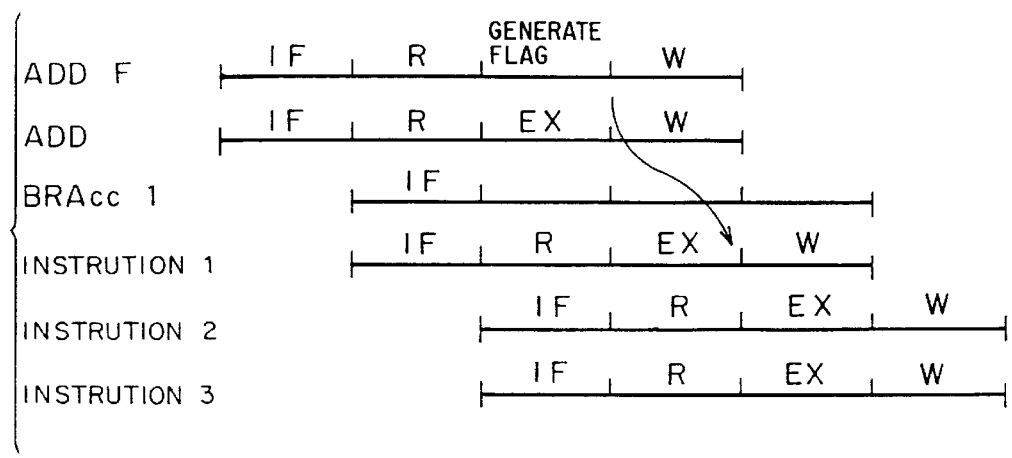
FIG. 30 is a timing chart for the operation of the embodiment of this invention.

Moreover, according to this invention, by making effective use of the fact that two instructions are processed at a time in one machine cycle, it is possible to process the conditional branch instruction in a special case at higher speed. That is, when processing a conditional branch instruction, the destination of the branching when the condition is satisfied is the next, and next instruction (instruction 2 in FIG. 30), the instructions 2 and 3 are executed irrespective of whether the condition is satisfied or not, and whether the W stage of the instruction 1 is suppressed or not is controlled by the satisfaction or not of the condition, so that when the condition is met, the waiting cyle can be eliminated. In this case, however, the conditional branch instruction is sure to be provided on the first instruction side. In the normal conditional branching, one waiting cycle occurs when the condition is satisfied, as described with reference to FIG. 14. In other words, since in this invention, two instructions are processed in one machine cycle at a time, the execution of instructions on the second instruction side can be controlled by whether the condition of the conditional branch instruction on the first instruction side is satisfied or not, without effect on the instruction process flow of two-instruction units.

Figure 31A:
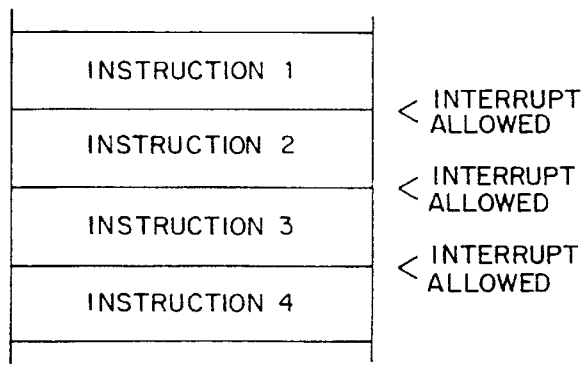
FIGS. 31A and 31B show instruction formats.
Figure 31B:
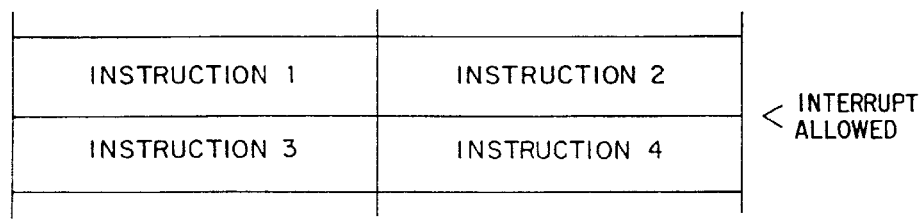

Moreover, in this embodiment, by making effective use of the processing of two instructions in one machine cycle at a time, it is possible to realize the "atomic" processing with ease. The atomic processing is the processing which is always made in a sequence, and which is used for the synchronization between processes. FIG. 31A shows the processing in the conventional computer, and FIG. 31B shows that in this embodiment. In FIG. 31A, there is a possibility that an interruption enters between the instructions, while in FIG. 31B no interruption occurs between the instructions 1 and 2, and between the instructions 3 and 4. Thus, in FIG. 31A a program for other processes may enter between arbitrary instructions, while in FIG. 31B there is the merit that the instructions 1 and 2 or the instructions 3 and 4 are sure to be executed in a sequence.

Figure 32:
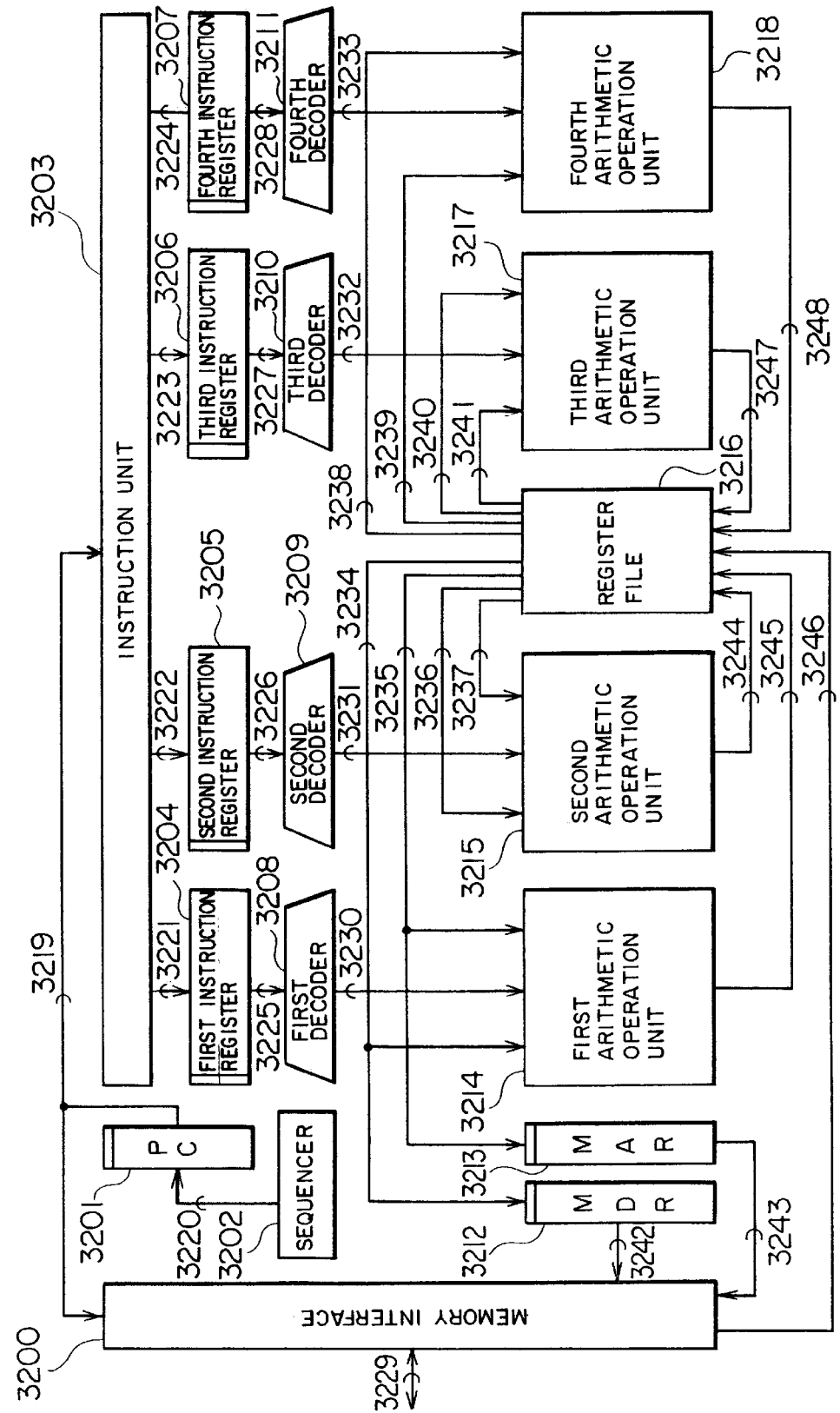
FIG. 32 is a block diagram of the whole construction of another embodiment of this invention.

FIG. 32 shows the construction of another embodiment of this invention. In this embodiment, 4 instructions can be processed in one machine cycle at a time. There are shown a memory interface 3200, a program counter 3201, a sequencer 3202, an instruction unit 3203, first to fourth instruction registers 3204 to 3207, first to fourth decoders 3208 to 3211, an MDR 3212, an MAR 3213, first to fourth arithmetic operation units 3214, 3215, 3217 and 3218, and a register file 3216. Each arithmetic operation unit shares the register file 3216. The operation of each portion is the same as in the embodiment shown in FIG. 1, and thus will not be described.

Similarly, the degree of parallel processing can be further increased, but since there is a program in which one branch instruction is present in each of several intructions, an extreme increase of the degree of parallel processing in such program will not be much effective. It is preferable to process about 2 to 4 instructions at a time. If the degree of parallel processing is further increased in the program with a few branches and a few conflicts, the performance is effectively increased. Moreover, if the degree of parallel processing is selected to be $2^n$ (n is a natural number), the instruction unit can easily be controlled.

Figure 33A:
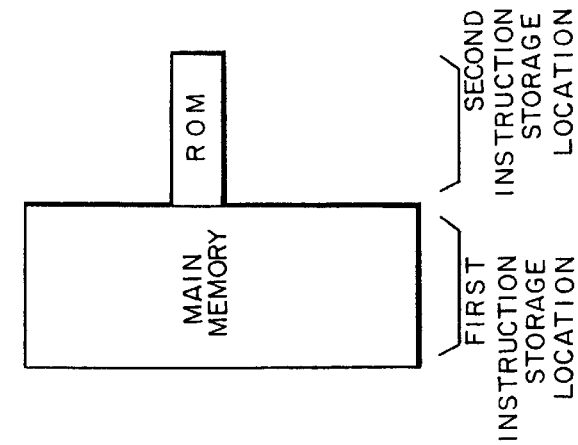
FIGS. 33(*a*) to 33(*c*) are diagrams of other embodiments of this invention, which make simultaneous partial processing of a plurality of instructions.
Figure 33B:
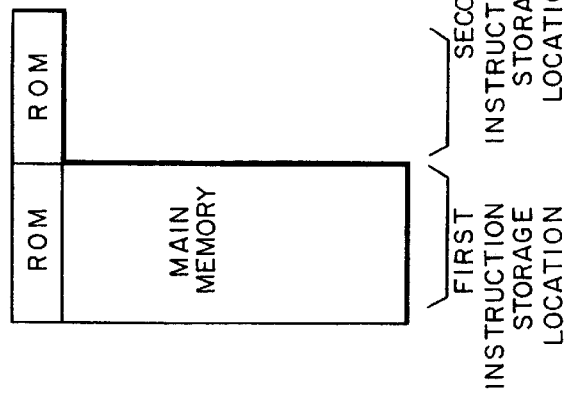
Figure 33C:
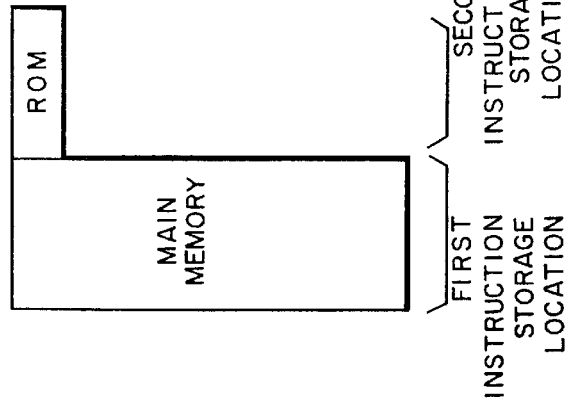

Still another embodiment of this invention will be mentioned. In the above embodiments described so far, a plurality of instructions are always processed at a time. It is also possible to obtain some advantage by normally processing one instruction in one machine cycle, and in some case, processing a plurality of instructions at a time. FIG. 33 shows three examples. In the example of FIG. 33a, the first instruction is stored in a main memory, and the second instruction is stored only on the head portion of the address space and stored in an ROM. In the example of FIG. 33b, the first and second instructions are stored in the head portion of the address space and stored in an ROM, and in the other portions of the main memory is stored only the first instruction. In the example of FIG. 33c which is substantially the same as that of FIG. 33a, the second instruction to be stored in an ROM is written in the intermediate portion of the address space. The whole construction of the computer is the same as in FIG. 1, and only the instruction unit 103 is required to be changed. In the ROM portion there is written a program with a high frequency of usage and with a high degree of parallel processing, which program is executed by a subroutine call from a routine. Since the ROM portion may be of a low capacity, a most suitable program can be produced by an assembler even without any compiler.

Figure 34:
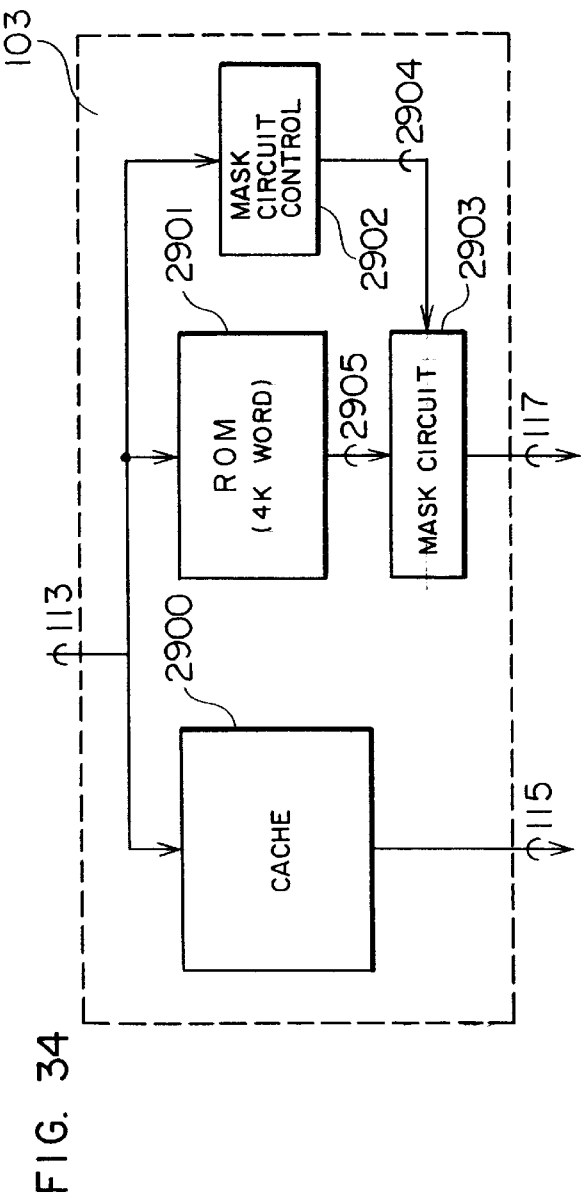
FIG. 34 is a schematic diagram of an instruction unit.

FIG. 34 shows the construction of the instruction unit 103 in FIG. 1 which construction is for realizing the example of FIG. 33a. There are shown a cache 2900, a 4 K words ROM 2901, a mask circuit 2903, and a mask circuit control circuit 2902. The mask circuit control circuit always monitors the address 113. Only when the more significant bits 12 to 31 of the address are all zero will an effective signal 2904 be asserted. The mask circuit 2903, only when the effective signal 2904 is asserted, supplies a ROM output 2905 to the second register as an output 117. At all other times, the NOP instruction is fed.

Figure 35:
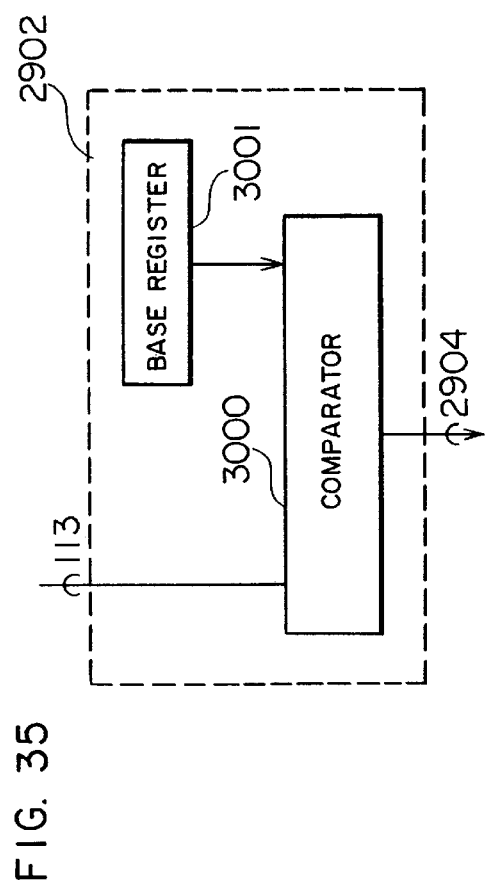
FIG. 35 is a schematic diagram of a mask circuit control circuit.

In order to realize the example of FIG. 33c, the mask circuit control circuit 2902 shown in FIG. 34 is required to be constructed as shown in FIG. 35. There are shown a comparator 3000 and a base register 3001. When the more significant bits 12 to 31 of the base register are coincident with the more significant bits 12 to 31 of the address 113, the comparator 3000 asserts the effective signal 2904.

Figure 36:
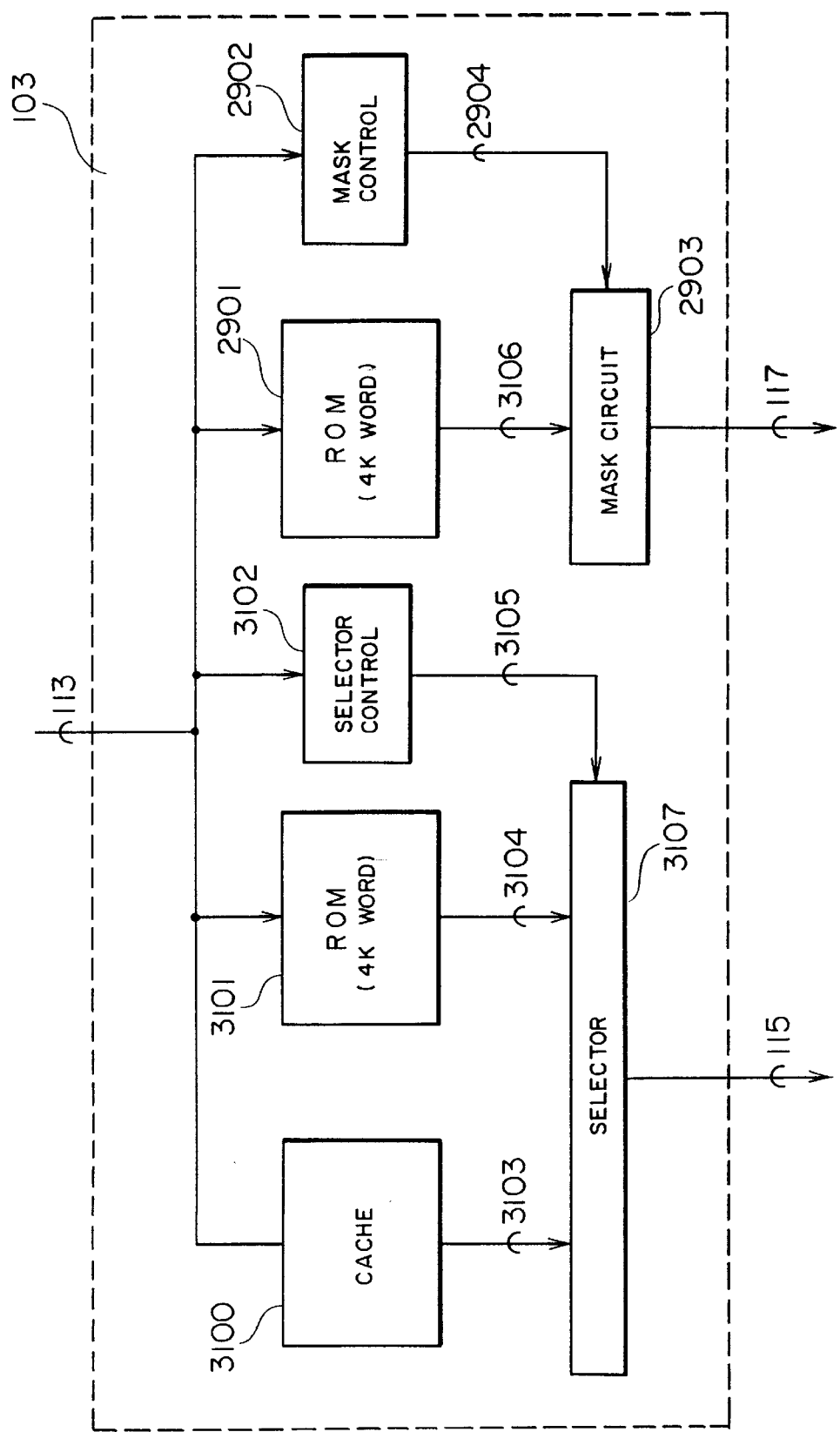
FIG. 36 is a schematic diagram of an instruction unit.

In order to realize the example of FIG. 33b, the instruction unit 103 shown in FIG. 1 is required to be constructed as shown in FIG. 36. The functions of the ROM 2901, mask circuit control circuit 2902, and mask circuit 2903 are the same as those represented by the same numbers in FIG. 29. In FIG. 36, there are shown a cache 3100, a 4 K word ROM 3101, a selector control circuit 3102, and a selector 3107. The selector control circuit 3102 always monitors the more significant bits 12 to 31 of the address 113. Only when all the bits are 0 will an ROM selection signal 3105 be asserted. The selector 3107, only when the ROM selection circuit 3105 is asserted, supplies an ROM output signal 3104 to the first instruction register as the output 115. At all other times, the cache output 3103 is supplied.

As described with reference with FIGS. 33 to 36, the hardware can be reduced by simultaneously processing a plurality of instructions for some portion, and forming that portion as an ROM. Also, since only for the ROM portion, most suitable design can be achieved by an assembler, there is the merit that it is not necessary to develop the compiler considering the simultaneous processing of a plurality of instructions. Moreover, by rewriting the ROM portion, it is possible to realize a high speed operation for each application and suitable for each application.

According to this invention, since a complicated instruction is decomposed into basic instructions, and a plurality of instructions are read and executed at one time in one machine cycle, a plurality of arithmetic operation units can be operated at a time, thus increase the processing ability.

Moreover, since the instructions have simple functions, and thus the number of pipeline stages can be decreased, the overhead upon branching can be made small.

Furthermore, since a plurality of arithmetic operation units are operated in parallel, the processing time for a complicated process can be decreased.

What is claimed is:

1. A processor system, comprising:
   means for fetching a plurality of instructions;
   predecode means for predecoding said plurality of instructions fetched by said fetching means and for generating information used for determining whether said plurality of instructions can be processed in parallel;
   a cache memory for storing said plurality of instructions and said information generated by said predecode means, said cache memory outputs said plurality of instructions in parallel such that a state of said plurality of instructions and information remaining in said cache memory after output of said plurality of instructions is the same as the state of said plurality of instructions and information before output of said plurality of instructions; and
   an execution unit for executing said plurality of instructions based on said information stored in said cache memory.

2. A processor system according to claim 1, wherein said execution unit comprises:
   arithmetic and logic operation means for executing said plurality of instructions based on said information stored in said cache memory.

3. A processor system according to claim 2, wherein said information is used by said arithmetic and logic operation means to control the execution sequence of said plurality of instructions.

4. A processor system according to claim 2, wherein said information is used by said arithmetic and logic operation means to resolve conflicts between various ones of said plurality of instructions in the parallel processing of said plurality of instructions.

5. A processor system according to claim 4, wherein the conflict indicated by said information is a register conflict.

6. A processor system according to claim 4, wherein the conflict indicated by said information is a resource conflict.

7. A processor system according to claim 6, wherein said resource conflict relates to plural instructions, of said plurality of instructions, being executed by the same execution unit.

8. A processor system according to claim 6, wherein said resource conflict relates to load instructions, of said plurality of instructions, which call for use by the same load unit.

9. A processor system according to claim 6, wherein said resource conflict relates to shift instructions, of said plurality of instructions, which call for use of the same shifter.

10. A processor system according to claim 2, wherein said information is expressed by a single bit.

11. A method of processing instructions, comprising the computer implemented steps of:
    fetching instructions from an instruction storage;
    predecoding the fetched instructions to obtain information for determining whether said instructions can be processed in parallel;
    storing said instructions together with said information in a cache memory;
    outputting said instructions from said cache memory in parallel such that a state of said instructions and information remaining in said cache memory after output of said plurality of instructions is the same as the state of said instructions and information before output of said plurality of instructions; and
    parallel processing said instructions output from said cache memory when said information stored together with said instructions indicates that said instructions can be processed in parallel without conflict.

12. A method according to claim 11, wherein the conflict indicated by said information is a register conflict.

13. A method according to claim 11, wherein the conflict indicated by said information is a resource conflict.

14. A method according to claim 13, wherein said resource conflict relates to plural instructions, of said instructions, being executed by the same execution unit.

15. A method according to claim 13, wherein said resource conflict relates to load instructions, of said instructions, which call for use by the same load unit.

16. A method according to claim 13, wherein said resource conflict relates to shift instructions, of said plurality, which call for use of the same shifter.

17. A method of processing instructions according to claim 11, wherein said step of parallel processing said instructions includes controlling the timing of execution of instructions in accordance with said information output along with said instructions.

18. A method of processing instructions according to claim 11, wherein said information is expressed by a predetermined number of bits in association with said instructions.

19. A data processing system, comprising:
    first storage means for storing instructions;
    decode means for decoding said instructions held in said first storage means to generate information to be used in controlling the order of execution of instructions;
    second storage means for storing instructions held in said first storage means and said information generated by said decode means and outputting a plurality of said instructions in parallel along with said information such that a state of said instructions and information remaining in said second storage means after output of said plurality of said instructions is the same as the state of said instructions and information before output of said plurality of said instructions; and
    arithmetic and logic operation means for executing said plurality of said instructions output from said second storage means based on said information held in said second storage means.

20. A data processing system according to claim 19, wherein said second storage means is a cache memory.

21. A data processing system according to claim 19, wherein said arithmetic and logic means is capable of executing said plurality of said instructions output from said second storage means in parallel and said information stored in said second storage means is used to determine whether said plurality of said instructions can be executed in parallel without conflict.

22. A data processing system according to claim 21, wherein the conflict indicated by said information is a register conflict.

23. A data processing system according to claim 21, wherein the conflict indicated by said information is a resource conflict.

24. A data processing system according to claim 23, wherein said resource conflict relates to plural instructions, of said plurality of said instructions. being executed by the same execution unit.

25. A data processing system according to claim 23, wherein said resource conflict relates to load instructions, of said plurality of said instructions, which call for use by the same load unit.

26. A data processing system according to claim 23, wherein said resource conflict relates to shift instructions, of said plurality of said instructions, which call for use of the same shifter.

27. A data processing system according to claim 19, wherein said decode means is connected between said first storage means and said second storage means.

28. A processor system according to claim 1, wherein said execution unit comprises:
   a plurality of arithmetic logic units which execute said plurality of instructions simultaneously.

29. A processor system, comprising:
   means for fetching a plurality of instructions;
   predecode means for predecoding said plurality of instructions fetched by said fetching means and for generating information used for determining whether said plurality of instructions can be processed in parallel;
   a cache memory for storing said plurality of instructions and said information generated by said predecode means, said cache memory outputs at least two instructions from said plurality of instructions in the same machine cycle such that a state of said plurality of instructions and information remaining in said cache memory after output of said at least two instructions is the same as the state of said plurality of instructions and information before output of said at least two instructions; and
   an execution unit for executing said at least two instructions based on said information stored in said cache memory.

30. A method of processing instructions, comprising the computer implemented steps of:
   fetching instructions from an instruction storage;
   predecoding the fetched instructions to obtain information for determining whether said instructions can be processed in parallel;
   storing said instructions together with said information in a cache memory;
   outputting at least two instructions from said instructions in the same machine cycle from said cache memory such that a state of said instructions and information remaining in said cache memory after output of said at least two instructions is the same as the state of said instructions and information before output of said at least two instructions; and
   parallel processing said at least two instructions output from said cache memory when said information stored together with said at least two instructions indicates that said at least two instructions can be processed in parallel without conflict.

31. A processor system according to claim 29, wherein said execution unit comprises:
   a plurality of arithmetic logic units which execute said at least two instructions simultaneously.

* * * * *